(12) United States Patent
Ovadia et al.

(10) Patent No.: US 12,184,473 B2
(45) Date of Patent: Dec. 31, 2024

(54) METHOD AND SYSTEM TO MITIGATE CABLE PLANT FAULTS USING ACCESS CPE DEVICE

(71) Applicant: Charter Communications Operating, LLC, St. Louis, MO (US)

(72) Inventors: Shlomo Ovadia, Denver, CO (US); Deependra Rawat, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/951,565

(22) Filed: Sep. 23, 2022

(65) Prior Publication Data

US 2024/0106696 A1     Mar. 28, 2024

(51) Int. Cl.
| | | |
|---|---|---|
| *H04L 41/06* | (2022.01) | |
| *H04L 12/28* | (2006.01) | |
| *H04L 27/26* | (2006.01) | |
| *H04L 41/0631* | (2022.01) | |
| *H04L 41/149* | (2022.05) | |
| *H04L 41/16* | (2022.01) | |

(52) U.S. Cl.
CPC ...... *H04L 41/0631* (2013.01); *H04L 12/2801* (2013.01); *H04L 27/2626* (2013.01); *H04L 41/149* (2022.05); *H04L 41/16* (2013.01)

(58) Field of Classification Search
CPC ............ H04L 41/0631; H04L 12/2801; H04L 27/2626; H04L 41/149; H04L 41/16
See application file for complete search history.

(56) References Cited

U.S. PATENT DOCUMENTS

| | | | |
|---|---|---|---|
| 11,196,841 B1 | 12/2021 | Ovadia | |
| 11,405,292 B2 | 8/2022 | Ovadia et al. | |
| 2021/0367860 A1* | 11/2021 | Sridhar | ............... H04L 41/5009 |
| 2022/0029908 A1* | 1/2022 | Rupe | ...................... H04L 69/40 |
| 2022/0109612 A1* | 4/2022 | Bush | ................... H04L 41/0631 |
| 2022/0182254 A1* | 6/2022 | Yates | .................... H04N 21/251 |
| 2023/0421470 A1* | 12/2023 | Sasaki | ................. H04L 43/0823 |

OTHER PUBLICATIONS

Signal Processing (Year: 2012).*
Cable Television Laboratories, Inc., "Data Over Cable Service Interface Specification Proactive Network Maintenance", Primer for PNM Best Practices in HFC Networks (DOCSIS® 3.1) CM-GL-PNM-3.1-V02-210114, (2020-2021).

(Continued)

*Primary Examiner* — Dac V Ha
(74) *Attorney, Agent, or Firm* — THE MARBURY LAW GROUP, PLLC

(57) ABSTRACT

Systems and methods of a field deployed access CPE device with smart and efficient agent integrated with an agile software architecture to collect and analyze proactive network maintenance (PNM) management information base (MIB) data. The access CPE device may determine the OFDMA channel's impulse response and group delay, stream the collected data to the operator's streaming and analytics platform to identify cable plant faults, determine whether the identified faults are located inside or outside the customer's home, and mitigate the impact of the identified faults via machine learning models.

19 Claims, 15 Drawing Sheets

(56) References Cited

OTHER PUBLICATIONS

Cable Television Laboratories, Inc., "Data-Over-Cable Service Interface Specifications DOCSIS 3.1, Physical Layer Specification, CM-SP-PHYv3.1-I08-151210", 245 pages, (2013-2015).
Cable Television Laboratories, Inc., "Data-Over-Cable Service Interface Specifications DOCSIS 3.1, Physical Layer Specification, CM-SP-PHYv3.1-I19-211110", 225 pages, (2013-2021).

* cited by examiner

METHOD AND SYSTEM TO MITIGATE CABLE PLANT FAULTS USING ACCESS CPE DEVICE

BACKGROUND

Wireline and wireless communication technologies have seen dramatic improvements over the past few years. Service providers now offer users a wide array of services, higher usage limits, and attractive subscription plans. Wireless dongles and embedded wireless modem cards allow users to use tablet computers, netbooks and laptops to access Internet protocol (IP) and data services through wireless networks. Internet-enabled smart phones, tablets, televisions, and gaming consoles have become essential personal accessories, connecting users to family, friends, work, leisure activities and entertainment. Users now have more choices and demand to have continuous and uninterrupted access to content, data and communications at any time.

The proliferation of these new services has increased the complexity of service provider networks. For example, to meet consumer demands for services, network provider now have to manage an extensive network of coaxial cables and radio frequency amplifiers that serve millions of residential subscribers and small-medium size businesses that use different types of network components and access devices (e.g., D3.1 embedded multimedia terminal adapter (eMTA), advanced wireless gateway (AWG), $1/10$G Ethernet passive optical network (EPON) optical network unit (ONU), etc.). Further, the coaxial networks are typically built with cascaded radio frequency (RF) trunk and distribution amplifiers, RF splitters and taps using a tree- and branch architecture. These components and other characteristics of existing and conventional solutions may limit or negatively impact the performance, efficiency, functionality, and/usability of the network. For example, it may be challenging to collect information that is adequate to determine whether an impairment or cable plant fault is inside or outside of a customer's home. In addition, field-deployed RF amplifiers, coaxial splitters, and inline coaxial taps may not have sufficient capabilities to report their operational status, environmental-based performance degradation, or failures. It may also be challenging to collect data and status information regarding in-home coaxial cable wiring and coaxial components.

SUMMARY

The various aspects include methods of detecting and analyzing cable plant impairments, which may include collecting, by a component with a data collector in a field deployed device, proactive network maintenance (PNM) management information base (MIB) data, parsing the collected PNM MIB data for all active subcarriers of an orthogonal frequency division multiple access (OFDMA) channel, removing a phase rotation from the parsed PNM MIB data at a cable modem termination system (CMTS), performing an inverse Fourier transform on the parsed PNM MIB data to generate a transform result, determining an impulse response and a group delay based on the generated transform result, and sending the determined impulse response and the determined group delay to a machine learning model in a streaming and analytics platform in a service provider network.

In some aspects, collecting the PNM MIB data may include collecting pre-equalizer coefficient values for all the active subcarriers in each of a plurality of OFDMA channels, determining the impulse response and the group delay based on the generated transform result may include determining impulse response values and group delay values for each of the plurality of OFDMA channels, and the method may further include determining whether an impairment is located inside a home network of field deployed device based on the impulse response values and the group delay values.

In some aspects, the method may include determining based on the determined impulse response values and the determined group delay values whether an impairment is located inside a home network of the field deployed device. In some aspects, the method may include using the machine learning model to determine an origin or a characteristic of the impairment in response to determining based on the determined impulse response values and the determined group delay values that the impairment is located inside the home network of the field deployed device. In some aspects, the method may include using the machine learning model to determine a distance between the impairment and a location of field deployed device based on the determined impulse response values and the determined group delay values in response to determining that the impairment is not located inside of the home network of the field deployed device.

In some aspects, using the machine learning model to determine the distance between the impairment and the location of field deployed device based on the determined impulse response values and the determined group delay values in response to determining that the impairment is not located inside of the home network of the field deployed device may include determining whether the impairment is due to corroded radio frequency (RF) splitters, determining whether the impairment is due to corroded coaxial connectors, determining whether the impairment is due to damaged coaxial cables, determining whether the impairment is due to damaged RF amplifiers, or determining whether the impairment is due to damaged coaxial taps.

Further aspects may include a computing system (e.g., field deployed device, streaming and analytics platform, etc.) having a processor configured with processor-executable instructions to perform various operations corresponding to the methods discussed above.

Further aspects may include a computing system having various means for performing functions corresponding to the method operations discussed above.

Further aspects may include a non-transitory processor-readable storage medium having stored thereon processor-executable instructions configured to cause a processor to perform various operations corresponding to the method operations discussed above.

Further aspects may include a system that includes a field deployed device that includes a field deployed device processor and a computing system that includes streaming and analytics processor, any or all of which may be configured to perform various operations corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
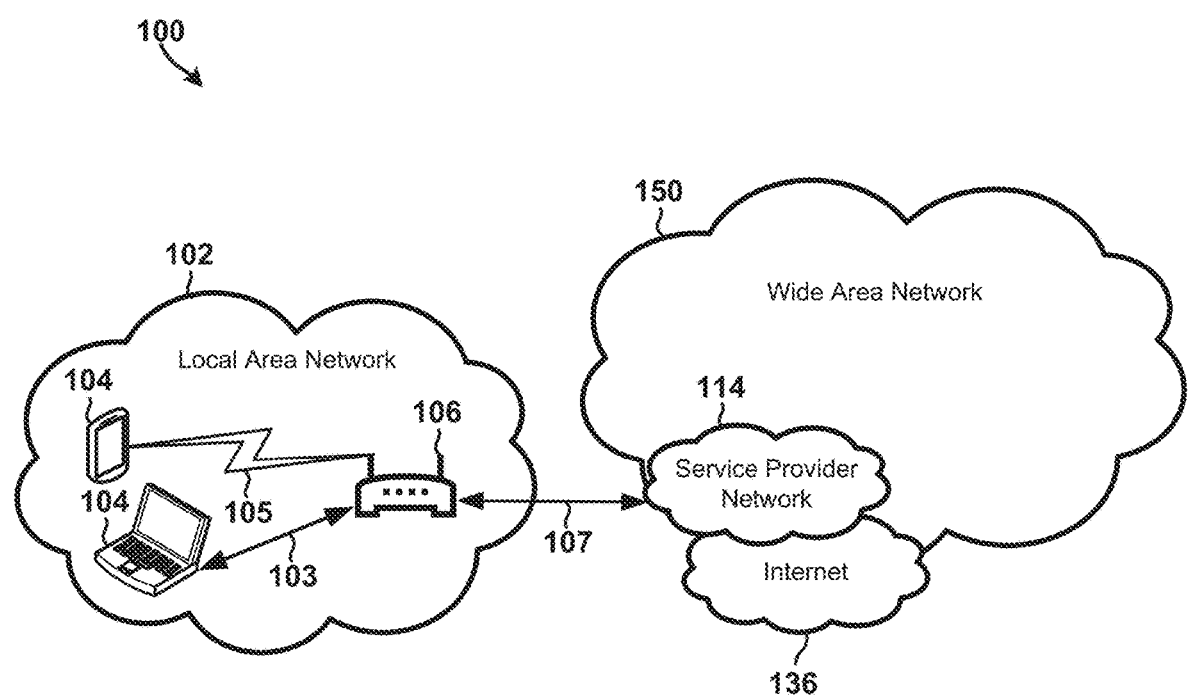
FIG. 1A is a block diagram of the customer's home network connected to the service operator's network suitable for use with some embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "service provider network" is used generically herein to refer to any network suitable for providing consumers with access to the Internet or IP services over broadband connections. Service provider networks may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-135/TDMA), evolution-data optimized (EV-DO), digital enhanced cordless telecommunications (DECT), Worldwide Interoperability for Microwave Access (WIMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing system. By way of illustration, both an application running on a computing system and the computing system may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The terms "containerized" and "container" may be used herein to refer to a software component that supports virtualization technology, enables the abstraction (or virtualization) of computing resources, and/or separates software applications from their underlying infrastructure (thus making them infrastructure agnostic). For example, a container may be one of many isolated user space instances operating on the kernel, each of which operates under the illusion of having full or exclusive access to the processors, peripherals, memory and I/O of the computing system. Application programs running inside of a container may only see the container's contents and devices assigned to that container. In addition to these isolation mechanisms, a container or kernel may include resource-management features that limit the impact of one container's activities on other containers.

The term "machine learning model" may be used herein to refer to any of a variety of information structures that may be used by a computing system to perform a computation or evaluate a specific condition, feature, factor, dataset, or behavior on a device. Examples of machine learning models include network models, neural network models, inference models, neuron models, classifiers, random forest models, spiking neural network (SNN) models, convolutional neural network (CNN) models, recurrent neural network (RNN) models, deep neural network (DNN) models, generative network models, ensemble networks, generative adversarial networks, and genetic algorithm models. In some embodiments, a machine learning model may include a weight value and a test question/condition suitable for evaluating collected data.

The term "feature vector" may be used herein to refer to an information structure that represents or characterizes collected data (e.g., sensor data, etc.) or which represents or characterizes a specific factor, feature, condition, data point, or aspect of collected data. A feature vector may include one or more features and their corresponding feature values. A feature value may be a number or symbol that represents a collected data point. A feature value may be associated with a data type that identifies how a feature (or its feature value) should be measured, analyzed, weighted, or used. For example, a data type may identify a range of possible feature values, meanings of the values, operations that may be performed on those values, etc.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC also may include any number of general purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. SoCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard, in a single UE, or a single CPE device. The proximity of the SoCs facilitates high speed communications and the sharing of memory and resources.

The term "multicore processor" may be used herein to refer to a single integrated circuit (IC) chip or chip package that contains two or more independent processing cores (e.g., CPU core, graphics processor unit (GPU) core, etc.) configured to read and execute program instructions. A SoC may include multiple multicore processors, and each processor in an SoC may be referred to as a core. The term "multiprocessor" may be used herein to refer to a system or device that includes two or more processing units configured to read and execute program instructions.

Wireless communication systems are widely deployed to provide various communication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Many customers or subscribers to a service provider's network connect to the Internet via a customer premise equipment (CPE) component/device. A CPE device may include a cable modem, digital subscriber line modem, router, switch, firewall, packet filter, wireless access point, and/or a residential gateway that provide network connectivity to home or small office network. In particular, a CPE device may allow UE devices on the local area network (LAN) to connect to a wide area network (WAN) and ultimately the Internet.

OpenWrt is an open-source project for embedded operating system based on Linux. OpenWrt is highly-flexible open-source operating system with a large ecosystem of vendors and developers that enable cable multiple system operators (MSOs) to rapidly develop new components, features and plugins that can be containerized.

The terms "STeMTA," "STLANeMTA," "eMTALat," "usCeMTA," "dsCeMTA," "latClient," and "connClient" may be used in this application to refer to different plugins/components that may be included in a field deployed device (e.g., Access CPE device, etc.). For example, "STeMTA" may be a plugin code name that obtain the Access CPE device's speed test results via the WAN port, "STLANeMTA" may be a plugin code name that obtain the Access CPE device's speed test results via the LAN port, "eMTALat" may be a code name for the plugin that first obtain the CMTS IPv4/v6 address, then measures, and then reports the Internet Protocol version 4 (IPv4) and Internet Protocol version 6 (IPv6) DOCSIS round-trip latency between an access CPE and a connected CMTS, "usCeMTA" may be a code name for the plugin that provides the cable modem upstream DOCSIS channel information, "dsCeMTA" may a code name for a plugin that provides cable modem downstream DOCSIS channel information, "latClient" may be a code name for a plugin that first measures and then reports the round-trip latency between a UE and an access CPE, "connClient" may be a code name for a plugin that first measures and then reports the number of transmitted and received packets in a given period of time by a UE.

Some cable Multiple System Operators (MSOs) deploy a two-box solution for both residential and Small and Medium-size Business (SMB) customers where the first box is an access CPE device (i.e., cable modem, ONU, etc.), and the second box is a wireless router. Cable operators typically have limited information about the access CPE device's status, and no information about the customer's home network, including what type of clients are connected to the home network, their bandwidth usage vs. time, etc.

Some embodiments disclosed herein may include components configured to collect, analyze, organize and/or render home network information so as to allow cable operators to identify impairments and faults, enhance their customers' experience by optimizing the customer's home network traffic, preventing potential field service impairment/failure issues, and facilitating the introduction of new services such as customer's home network management and security. In addition, the embodiments may improve the performance, efficiency and functioning of the service provider network and the components/devices that are included in, utilize, or benefit from the service provider network. The improvements to performance and functioning of the communication system and its constituent network components will be evident from the disclosures below.

FIG. 1A is a simplified block diagram that provides an example of a network 100 that may be used to implement the various embodiments. In the example illustrated in FIG. 1A, the network 100 includes a local area network (LAN) 102 and a wide area network (WAN) 150. The LAN 102 includes user equipment (UE) 104 devices (e.g., laptop, mobile phone) coupled to a field-deployed customer premise equipment (CPE) 106 device via wired 103 and wireless 105 communication links. The CPE 106 includes communication links 107 to a service provider network 114 within the WAN 150 that allow the UE 104 devices to send and receive information to and from the Internet 136. In some embodiments, the CPE 106 may include a cable modem that operates as a network bridge that provides bi-directional data communication via radio frequency channels on a hybrid fiber-coaxial (HFC) and/or radio frequency over glass (RFoG) infrastructure.

In some embodiments, a cable modem termination system (CMTS) component may be deployed in a headend or in a network node, and configured to facilitate high speed communications between the CPE 106 and the components within the service provider network 114.

The service provider network 114 may include various network components for providing consumers with access to the Internet 136 or IP services over broadband connections. In some embodiments, the CPE 106 may include an Optical Network Unit (ONU) that operates as a network bridge that provides bi-directional data communication via Passive Optical Network (PON). In some embodiments, an Optical Line Terminal (OLT) component may be deployed in a headend or in a fiber node, and configured to facilitate high speed communications between the CPE 106 and the components within the service provider network 114. In some embodiments, the access CPE device 106 may include a 10G EPON S-ONU hardware and a corresponding software stack suitable for broadband Internet access. In some embodiments, the access CPE device 106 may include a Gigabit PON ONU hardware and a corresponding software stack suitable for broadband Internet access.

Figure 1B:
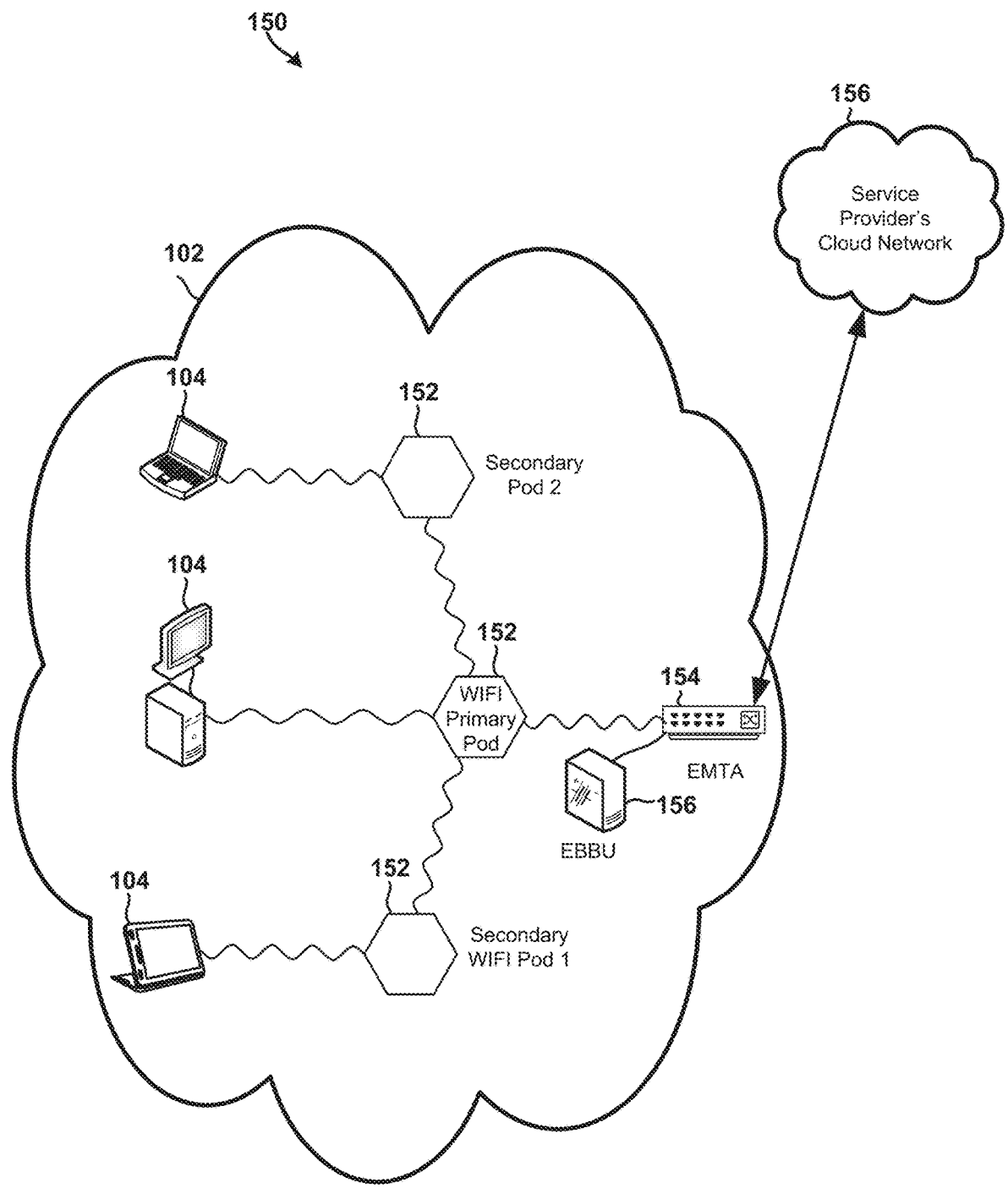
FIG. 1B is a block diagram of home network where the access CPE device is connected one or more Wi-Fi routers/Aps.

FIG. 1B is an illustration of a wireless mesh home network 150 that may be used to implement the various embodiments. In the example illustrated in FIG. 1B, the UE 104 devices (e.g., laptop, desktop computer, tablet) connect to Wi-Fi pods 152 (or Wi-Fi routers, Wi-Fi extenders, etc.) that are coupled to an embedded multimedia terminal adapter (eMTA) 154 that is configured to communicate with the service operator's cloud and/or OpenSync™ network 156. Each of the Wi-Fi pods 152 may be a Wi-Fi access point, Wi-Fi extender, or other similar device. The eMTA 154 may be a combination cable modem with an embedded multimedia adapter. The UE 104 devices, Wi-Fi pods 152 and cable modem eMTA 154 may all be included in the same LAN 102. The Wi-Fi pods 152 and/or cable modem eMTA 154 may be included in a CPE device 106.

The cable modem eMTA 154 may be an OpenWrt-based D3.1 eMTA router, and the Wi-Fi pods 152 may be wireless APs/extenders for mesh networking. For example, the cable modem eMTA 154 may provide IPv4/v6 routing functionality and the Wi-Fi pods 152 may act as the Wi-Fi access points (APs) for all the customer's UE 104 devices.

With reference to FIGS. 1A and 1B, a service provider network 114 (e.g., cable operator, etc.) may include millions of field-deployed devices (e.g., CPE device 106 such as DOCSIS 3.0 or 3.1 or 4.0 cable modem eMTA 154, wireless gateway, etc.), any or all of which may be susceptible to cable plant impairments/faults. For example, as the signal propagates through the coaxial cable, the signal may experience different types of signal loss and distortions such as a coupling loss, poor coaxial splitter or tap isolation, impedance mismatch, micro-reflections, signal delay distortions, etc. As a further example, corrosion on a center seizure screw where the coax cable enters an RF amplifier or a physical tap may cause some of the RF energy to propagate and eventually hit another physical tap. The coaxial tap may include components that prevent upstream signals from passing on the downstream, which may cause the original reflected signal to be reflected back towards the CMTS. As a result, the CMTS may receive an impaired signal that includes both the main signal and a reflected signal.

To address such impairments/faults, the CMTS may be configured to evaluate the communication signals received from the CPE 106 to determine whether the signal is impaired and/or identify the cause (e.g., tilt, roll-off, in-channel standing waves, etc.) of an impairment (e.g., micro-reflections, group delay distortion, etc.). Upstream pre-equalization allows cable modems to adapt their transmission to maximize the fidelity at the CMTS receiver. To achieve this, the CMTS may measure the cable modem received signal and calculate the amplitude and phase corrections that are needed. This correction information may be represented as a set of complex coefficients that are transmitted to the cable modem in the downstream channel. When the cable modem receives the coefficients, it may apply them to the transmitter to pre-distort the signal by using a waveform that is the inverse of the channel response. This adaptive upstream pre-equalization process may run periodically as directed by the operator.

The CMTS may periodically inform or instruct the CPE to pre-distort its signal to cancel out the effects of that impairment. For example, the CMTS may instruct the CPE 106 to modify its transmitted signal so that when pre-equalization data from the CPE 106 is received by the CMTS, the CPE 106 transmitted signal is modified based on the channel conditions.

Thus, a CMTS may inform or instruct a CPE 106 to distort (or pre-distort) its signal to cancel out the effects of an impairment, and a PNM component may identify the components (e.g., cable plant components, CMTS, etc.) that include CPE 106 devices that are compensating for impairments. A single CMTS may serve hundreds or thousands of homes, LANs or CPEs 106. Many service providers do not have visibility into the specific cable modem adaptive pre-equalization process of individual CPEs 106 or field deployed devices.

DOCSIS single-carrier upstream equalization data has been mined for over 10 years to provide trouble-shooting information about the cable plant impairments. Yet, using conventional solutions, a common limitation of both upstream and downstream single carrier signals has been the relatively narrow bandwidth, which is 6.4 MHz upstream channel bandwidth, and 6 MHz downstream channel bandwidth.

Upstream pre-equalization may allow the field-deployed devices (e.g., CPE 106,) to adapt their upstream transmission to maximize the fidelity at the CMTS receiver. The CMTS component may measure the received upstream probes, determine the required amplitude and phase corrections, generate set of complex coefficients (pre-equalizer coefficients), and send the generated coefficients to the field-deployed device in the downstream channel. The field-deployed device may receive and apply the coefficients to the transmitter to pre-distort the signal (e.g., by using a waveform that is the inverse of the channel response, etc.). These operations may be performed periodically. The embodiments may overcome the limitations of conventional solutions to collect information that is adequate for determining whether a cable plant fault is inside or outside of a customer's home, information for determining the operational status, environmental-based performance degradation, failures, etc. of the network components (e.g., field-deployed RF amplifiers, coaxial splitters, inline coaxial taps, etc.), and/or information regarding in-home coaxial cable wiring and coaxial components.

Figure 2A:
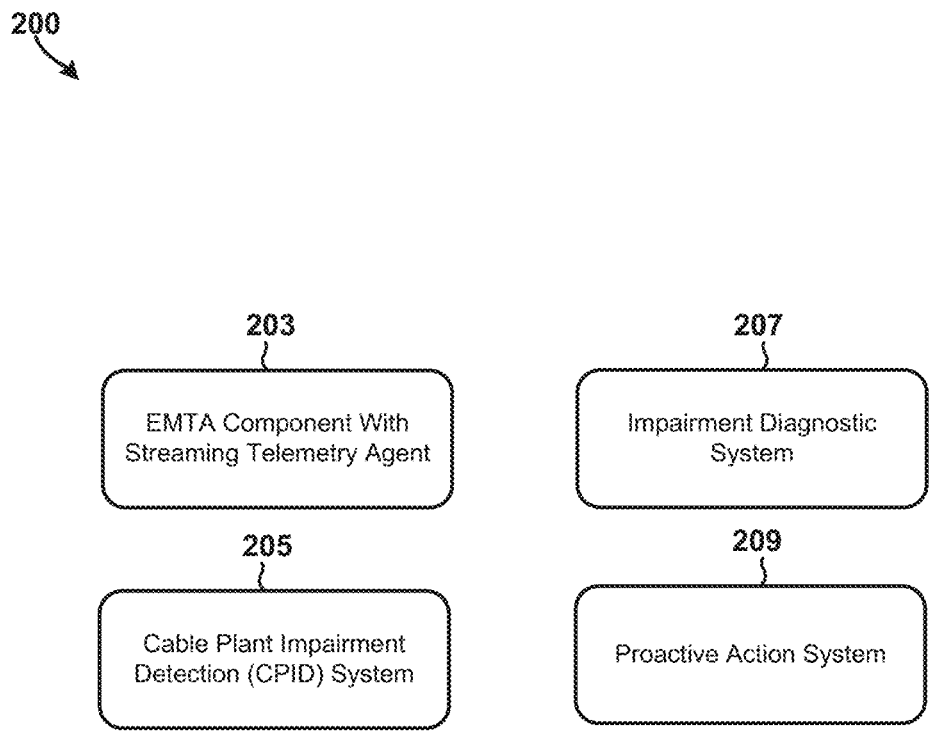
FIGS. 2A-2D are block diagrams of systems that include example field deployed device (CPE device, eMTA, etc.) equipped an agile software architecture and which may be configured to stream data to an analytics streaming platform in accordance with the various embodiments.

FIGS. 2A-2D illustrate example systems that include a field deployed device 202 (e.g., CPE device 106, cable modem eMTA 154, etc.) equipped an agile software architecture and configured to stream telemetry data to an analytics streaming platform that is available both to a service provider's customer care agent as well as the service provider's customer in accordance with some embodiments. FIG. 2A illustrates a system 200 that includes an OpenWrt D3.1 eMTA component 203 with streaming telemetry agent (e.g., streaming collected agent, etc.), a cable plant impairment detection (CPID) system 205, an impairment diagnostic system 207 configured to determine the type and location of an impairment, and a proactive action system 209 configured to proactively mitigate the impacts of the cable plant faults and/or in-home wiring issues on the field-deployed device. In some embodiments, the OpenWrt D3.1 eMTA component 203 with streaming telemetry agent may be included in a field deployed device. In some embodiments, any or all of the CPID system 205, impairment diagnostic system 207, and a proactive action system 209 may be included in a streaming and analytics platform.

Figure 2B:
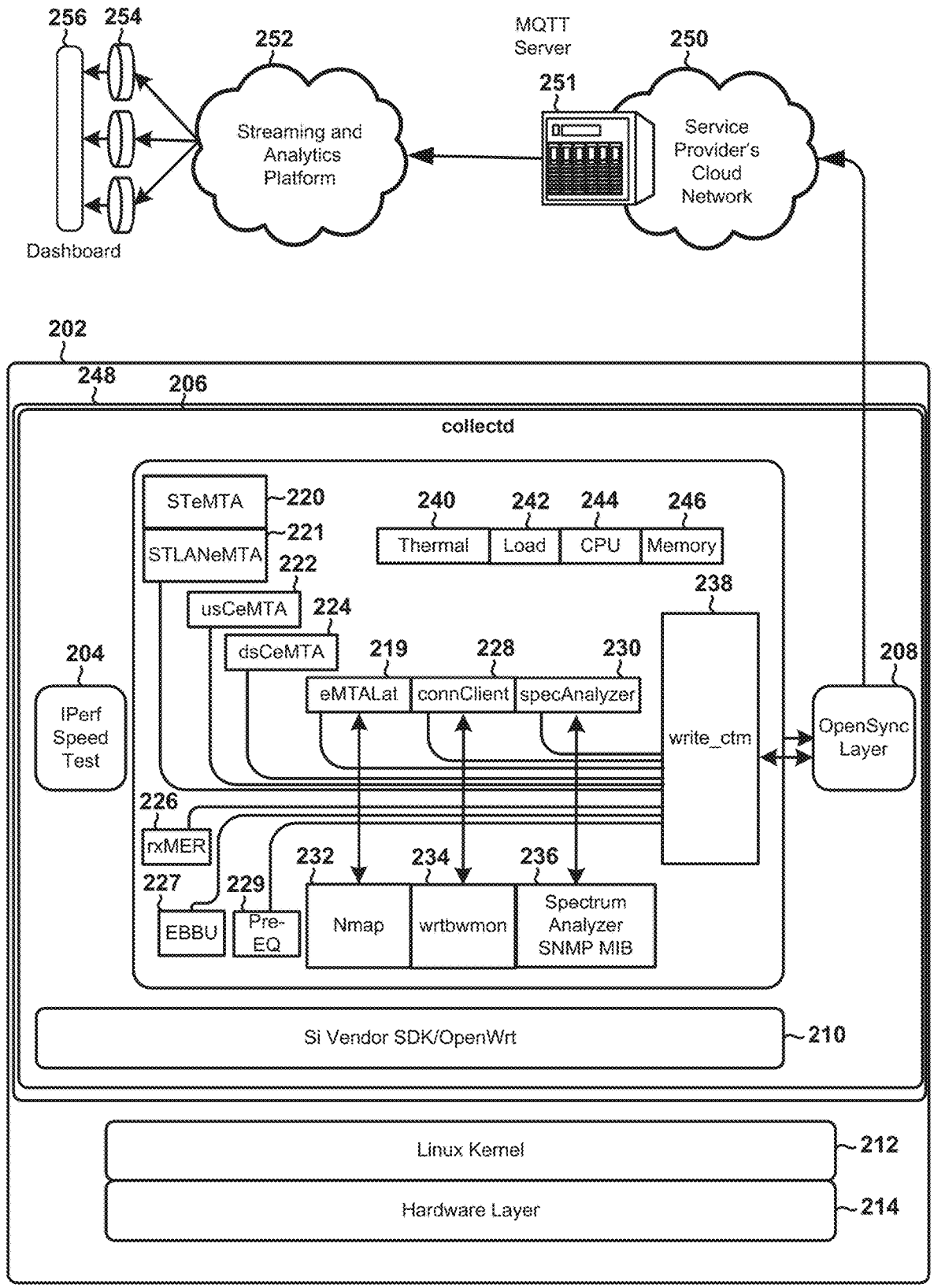

FIG. 2B illustrates that the field deployed device 202 may include an application layer 248, the Linux kernel 212 and a hardware layer 214. The application layer 248 includes an iPerf speed test 204 component, a collected 206 component, an OpenSync™ Layer 208, and a silicon vendor software development kit (Si Vendor SDK) integrated with the OpenWrt code 210.

Figure 2C:
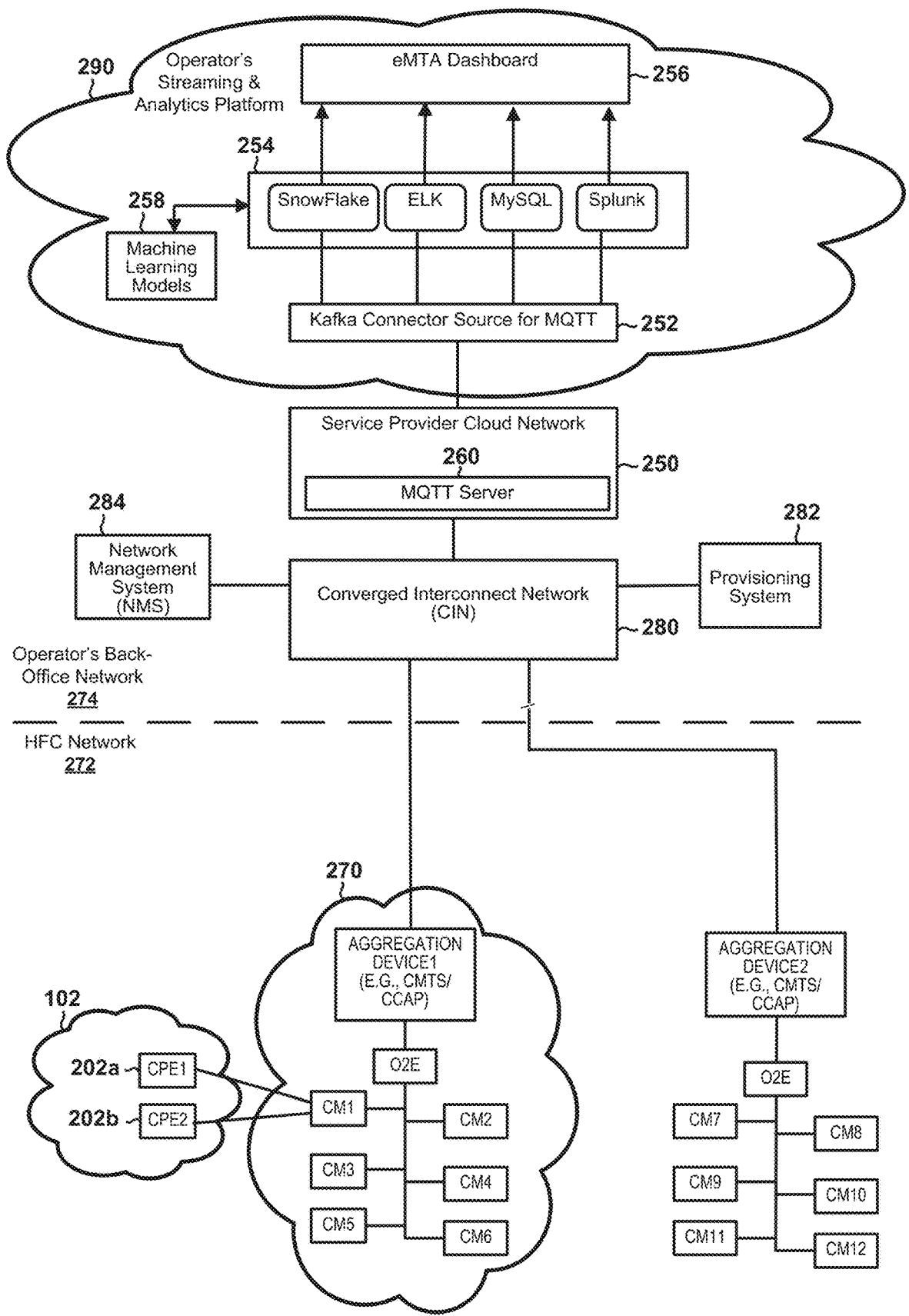

FIG. 2C illustrates that two or more field deployed devices 202a, 202b may be included in the same local area network 102 and coupled to network components 270 in a hybrid fiber-coaxial (HFC) network 272. The network components 270 in the HFC network 272 may be coupled to a converged interconnect network (CIN) 280 in the operator's back-office network 274. The operator's back-office network 274 may include a provisioning system 282, a network management system 284, a service provider cloud network 250, and a service operator's streaming and analytics platform 290, where the streaming telemetry data is first ingested by the Kafka connector source for the MQTT server 252. The Kafka Brokers (not shown in FIG. 2C) received the converted telemetry data from Protobuf to Apache Avro™ format, and transmit the telemetry data to the Kafka Connector Sinks (not shown in FIG. 2C), and then the telemetry data is ingested by different data analytics tools (e.g., SnowFlake, MySQL, ELK) 254 and a displayed on an eMTA dashboard 256. A Machine Learning Model (MLM) 258 may be used to parse the received telemetry data, recognize patterns, and provide predictions. The operator's eMTA dashboard 256 may be a multi-platform open-source analytics and interactive visualization web application that users may customize to create complex monitoring dashboards. In some embodiments, the cloud network 250 may include a message queuing telemetry transport (MQTT) server 260 that is configured to support various forms of authentication and/or various data security mechanisms (e.g., using a script to generate security certificates). In some embodiments, the cloud network 250 may be an OpenSync™ Cloud that is configured to provide the operator with various command and control services, including network status, IP address, network mask, DHCP status, parental control, speed test initiation and results, reset and reboot device, etc.

The streaming and analytics platform 290 may be implemented via a computing system that includes one or more computing devices, shared physical infrastructure and/or commodity hardware. As an example, a computing system suitable for implementing the streaming and analytics platform may include one or more streaming and analytics processors, SIPs, SOCs, network on chips (NOCs), memories, etc. The processors may be application processors, digital signal processors (DSPs), modem processors, graphics processors, etc. Each of the processors could be single or multicore processors.

Figure 2D:
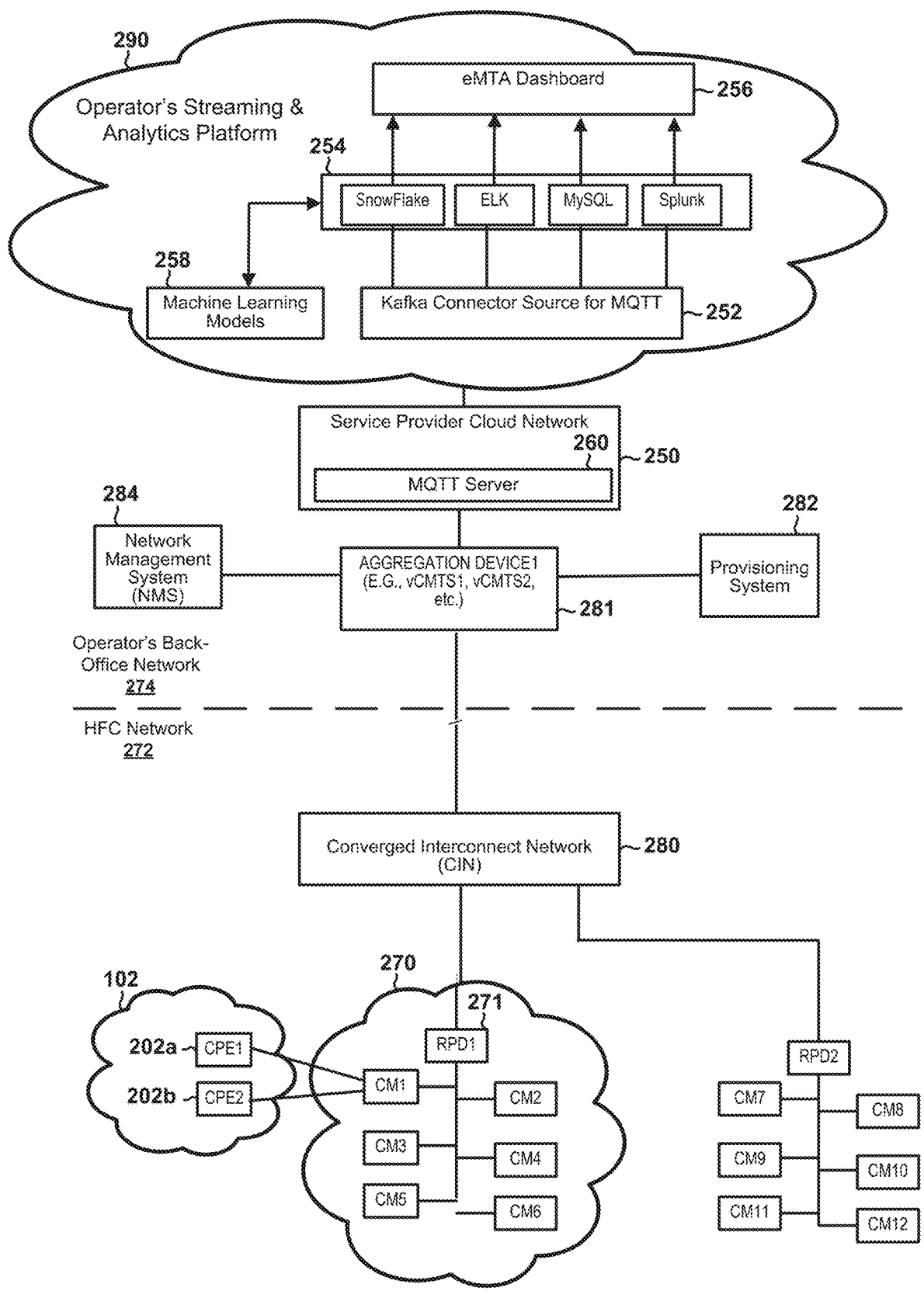

FIG. 2D illustrates that the network components 270 may include Remote PHY devices (RPD) 271 and one or more virtualized CMTSs (vCMTSs) 281 as an aggregation device. vCMTS technology takes the key access network functions out of the cable headend and place them in software containers running on commercial-of-the-shelf (COTS) servers. This enables service providers to transition to a distributed access architecture (DAA) by disaggregating the CMTS. FIG. 2D also illustrates that, in some embodiments, the CIN 280 may include included in the HFC network 272 domain.

As mentioned above, some embodiments may perform machine learning operations and/or use MLMs to parse the received telemetry data, recognize patterns, and provide predictions. In some embodiments, the machine learning operations may include training MLMs, collecting data objects, generating feature vectors based on the collected data objects, applying the feature vectors to the MLMs to generate an analysis result. Applying a feature vector to a MLM may generate a plurality of answers to a plurality of different test conditions. Each of these answers may be represented by a numerical value. The device processor may multiply each of these numerical values with their respective weight value to generate a plurality of weighted answers. The device processor may then compute or determine a weighted average based on the weighted answers, compare the computed weighted average to one or more threshold values, and perform a responsive action (e.g., classify/label the collected data, etc.) based on the results of the comparison. For example, if the computed weighted average is "0.79" and the threshold value is "0.75," the device processor could determine that the collected dataset is suitable (or that it is not suitable) for providing a prediction and/or for use in retaining the MLMs.

With reference to FIG. 2B, the iPerf speed test 204 component may be configured to initiate the iPerf speed test, measure downstream and upstream throughput on the WAN interface of the field deployed device 202, and stream the iPerf speed test results via the OpenSync™ layer to the operator's streaming and analytics platform.

The collected 206 component may be an OpenWrt data collector that offers a variety of Plugins (software programs), and may be used to collect different types of telemetry data as shown in FIG. 2B. The collected 206 component may also gather metrics from other various sources, such as the operating system, applications, log-files and external devices. The collected 206 component may temporarily store the collected information (metrics) and/or stream the collected metrics to the service provider's network via the OpenSync™ layer. The collected metrics (or statistics computed based on the metrics) may be used to monitor systems, find performance bottlenecks (i.e. performance analysis) and predict future system behavior such as system load using, for example, Machine Learning Model (MLM) tools.

The various embodiments add new capabilities and functionality to the collected 206 component, which may be integrated with the Si vendor SDK 210 and supported by the Linux kernel 212. These new capabilities and/or new functionality may be provided by a STeMTA 220, STLANeMTA 221, a eMTALat 219, a usCeMTA 222 component, a dsCeMTA 224 component, a receiver modulation error ratio (rxMER) data 226 component, an external battery backup unit (EBBU) 227 component, a connClient 228 component, a Pre-EQ 229 component, a specAnalyzer 230 component, a network mapper (Nmap) 232 component, a wrtbwmon 234 component, a spectrum analyzer SNMP MIB 236 component, a write_ctm 238 component, a thermal 240 component, a load 242 component, a CPU 244 component, a memory 246 component.

Each of these components 220-246 may be configured to periodically collect telemetry data from the field deployed device 202 and customer home network and stream the telemetry data to the service operator's streaming and analytics platform 290, which is ingested by different data analytics tools (e.g., MySQL, ELK) 254 and a displayed on a dashboard 256, via a service operator's cloud network 250. In some embodiments, the cloud network 250 may include a message queuing telemetry transport (MQTT) server 260. In some embodiments, the cloud network 250 may be an OpenSync™ Cloud that is configured to provide the operator with various command and control services, including network status, IP address, network mask, DHCP status, parental control, speed test initiation and results, reset and reboot device, etc.

Each of the eMTALat 219, STeMTA 220 component, STLANeMTA 221 component, the usCeMTA 222 component, the dsCeMTA 224 component, the rxMER data 226 component, the connClient 228 component, and the specAnalyzer 230 component may be communicatively coupled to the write_ctm 238 component. The rxMER data 226 component, the connClient 228 component, and the specAnalyzer 230 component may each be communicatively coupled to the Nmap 232 component, the wrtbwmon 234 component, and the Silicon vendor SDK spectrum analyzer 236 component. The OpenSync™ Layer 208 may be configured to enable OpenSync™ command and control connectivity to the operator's cloud network 250 via integrated OpenSync™ target layer.

The usCeMTA 222 component and dsCeMTA 224 component may be configured to pull all the DOCSIS upstream and downstream channel information used by the field deployed device 202 and/or CPE device 106 (RF level, channel frequency, etc.), which may then be streamed to the dashboard 256.

The rxMER data 226 component may be configured to measure and report the downstream received OFDMA channel's modulation error ratio in the Access CPE 154 in the home network.

The connClient 228 component may be configured to obtain the number of transmitted and received packets from the UE 104 devices, such as when the UE devices 104 are wirelessly connected to the Wi-Fi pod, which is connected via Ethernet cable to the Access CPE device 154 operating in a routing mode.

The Pre-EQ 229 component may be configured to obtain for each upstream OFDMA channel its pre-equalization data, and then calculate the channel's impulse response and group delay.

The specAnalyzer 230 component may be configured to obtain the RF downstream and upstream spectrum within the selected frequency range (i.e., start and stop frequencies) of the field deployed device 202 (e.g., access CPE device, etc.).

The wrtbwmon 234 component may be configured to provide per user bandwidth monitoring capabilities and generate usage reports.

The Nmap 232 component may be configured to perform various network discovery and security auditing. The Nmap 232 component may also be used for tasks such as network inventory, managing service upgrade schedules, and monitoring host or service uptime. The Nmap 232 component may use raw IP packets to determine what hosts are available on the network, what services (application name and version) those hosts are offering, what operating systems (and OS versions) they are running, what type of packet filters/firewalls are in use, and dozens of other characteristics.

The thermal 240 component, load 242 component, CPU 244 component, and the memory 246 component may be supported plugins. The thermal 240 component may be configured to collect and report SoC temperatures of the deployed device 202. The CPU 244 component may be configured to collect the CPU utilization of Access CPE device 154 in the selected period of time. This includes various CPU activities, including executing system code, waiting for IO-operations and being idle. The load 242 component may be configured to collect the system load, which identifies the number of runnable tasks in the run-queue and may be provided by many operating systems as a one, five or fifteen-minute average. The system load numbers may give a rough overview over the utilization of a machine. The memory 246 component may collect information regarding the dynamic random access memory (DRAM) utilization, which may be reported by their use by the operating system. It should be pointed out that the smart remote agent on the access CPE device (field deployed device 202) may include a remotely configurable schedule plan for how often each of the collected plugins reports changes either in the access CPE system and the home network.

In addition to added components 220-246, in some embodiments, the field deployed device 202 may be equipped with components that collect and stream metrics, statistics and other information to the dashboard 256 component. Some embodiments may integrate a smart remote agent on field deployed device 202 that provides streaming data telemetry, alarms, and event notifications to the customer and the customer care agent via the dashboard 256 component.

In some embodiments, the dashboard 256 component may be configured to display home network traffic metrics collected from all the wirelessly connected devices via the Wi-Fi pods or Wi-Fi Access Points (e.g., Tx/Rx data packets for each device, RT latency, etc.), router system information, RF downstream and upstream spectrum information, cable modem downstream/upstream channel information, event/alarm information, a customer location map, speed test information, voice health metrics, external battery backup unit (EBBU) metrics, and access CPE device information.

The access CPE system information may include various different types of information, such as CPU utilization in a selected period of time, free memory in a selected period of time, system load in a selected period of time, networking information (e.g., IP address, network mask, DHCP status, etc.), instantaneous and average system temperatures, average, minimum and/or maximum RT IPv4 and IPv6 latency in a selected period of time to the CMTS.

The cable modem downstream/upstream channel information may include downstream channel info (e.g., channel ID, channel type, lock status, channel bonding status, received power level, SNR/MER, channel center frequency, channel width, modulation profile ID, etc.) and/or upstream channel info (e.g., channel ID, transmit power level, channel center frequency, channel width, channel bonding status, etc.).

The dashboard's 256 event/alarm information may include collected metrics alarms where one or more red thresholds were violated (e.g., if the temperature of the device is significantly elevated, and the device is about shut-down or go into energy saving mode, etc.) and/or security notifications (e.g., if someone is trying to temper with the Access CPE via unauthorized remote access to the device's management and control GUI via SSH, etc.).

The customer location map may provide the customer care agent information identifying where the customer is located within service provider's service area footprint.

The speed test information may include downstream/upstream speed test results on the WAN or LAN ports.

The voice health metrics may include phone line number, phone status (on/off hook), phone line IPv4 address, phone line IPv6 address, voice call start time, voice call end time, voice call duration, voice call failed, phone line registration status, etc.

The EBBU metrics may include health metrics, manufacturer identity, hardware model number, software agent version, battery status, EBBU output voltage, estimated remaining charge capacity, alarm description (e.g., on battery, low battery, depleted battery, EBBU shutdown in pending, EBBU shutdown is eminent, etc.).

As mentioned above, the field deployed device 202 may be configured to detect cable plant impairments, and stream the collected impairment data to a dashboard component that displays the impairment diagnostics (e.g., in terms of location and type of cable plant faults, etc.).

Figure 3A:
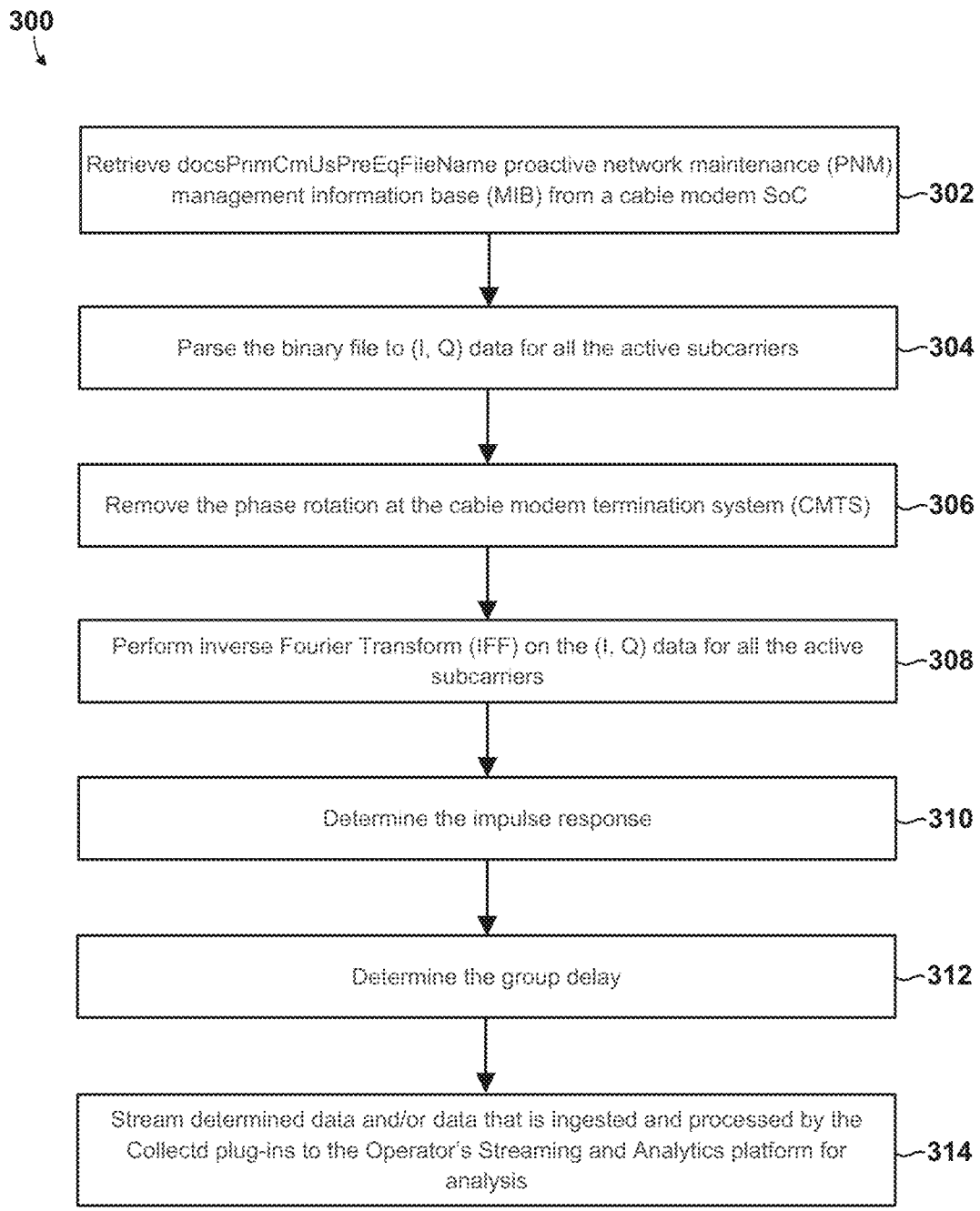
FIGS. 3A and 3B are process flow diagrams illustrating methods of detecting cable plant impairments in accordance with some embodiments.

FIG. 3A illustrates a method 300 of detecting cable plant impairments in accordance with some embodiments. Method 300 may be implemented in a processor of a field deployed device 202 that includes a smart agent implemented in the OpenWrt software stack (RG SoC).

In block 302, the Pre-EQ 229 component within the smart agent may retrieve docsPnmCmUsPreEqFileName proactive network maintenance (PNM) management information base (MIB) from a cable modem SoC. The PNM MIB may include the pre-equalizer coefficient values for all the active subcarriers (SCs) in each OFDMA channel. In some embodiment, the Pre-EQ 229 component may collect PNM MIB data from multiple OFDMA channels for all the active subcarriers.

In block 304, the Pre-EQ 229 component in the smart agent may parse the binary file to (I, Q) data for all the active subcarriers. In some embodiment, the Pre-EQ 229 component may parse data from multiple OFDMA channels for all the active subcarriers.

In block 306, the Pre-EQ 229 component in the smart agent may remove the phase rotation at the CMTS.

In block 308, the Pre-EQ 229 component in the smart agent may perform inverse Fourier Transform (IFF) on the (I, Q) data for all the active subcarriers.

In block 310, the Pre-EQ 229 component in the smart agent may calculate the impulse response. For example, the smart agent may calculate the OFDMA channel's impulse response using the formula for the Impulse Response (dB) $=20*\log_{10} (I^2+Q^2)^{1/2}$. In some embodiments, the Pre-EQ 229 component may determine the impulse response for each of the multiple OFDMA channels.

In block 312, the Pre-EQ 229 component in the smart agent may calculate the group delay. For example, the smart agent may calculate the group delay using the formula Group Delay (ns)$=-d\varphi/d\omega=(-1/2\pi)*d\varphi/df$. The smart agent may determine that the group delay ripple (which is approximately 86.6 ns as shown in the example illustrated in FIG. 8) and/or determine how well the pre-equalizer value are compensating for linear distortions such as micro-reflections, amplitude, Ripple, and group delay in the OFDMA channel. In some embodiments, the Pre-EQ 229 component may determine the group delay for each of the multiple OFDMA channels.

In block 314, the Pre-EQ 229 component in the smart agent may stream the computed/determined data and/or data that is ingested and processed by the collected plug-ins to the operator's streaming and analytics platform for analysis.

Thus, in block 302, a component with a data collector in a field deployed device may collect PNM MIB data. In block 304, the component may parse the collected PNM MIB data for all OFDMA channel's active subcarriers. In block 306, the component may remove a phase rotation from the parsed PNM MIB data at a CMTS. In block 308, the component may perform an inverse Fourier transform on the parsed PNM MIB data to generate a transform result. In block 310, the component may determine an impulse response based on the generated transform result. In block 312, the component may determine the group delay based on the generated transform result. In block 314, the component may send the determined impulse response values and determined group delay values to a machine learning model in a service provider's streaming and analytics platform.

In some embodiments, method 300 may further include determining (e.g., in the services provider's cloud network 250, in the streaming and analytics platform 252, etc.) whether an impairment is located inside or outside of a home network of the field deployed device based on the impulse response values (determined in block 310) and the group delay values (determined in block 312). In some embodiments, the component may determine whether an impairment is located inside or outside of a home network of the field deployed device based on collecting and parsing PNM MIB data from multiple OFDMA channels for all the active subcarriers and determining the impulse response and group delay for each of the OFDMA channels.

In some embodiments, method 300 may include using a machine learning model (MLM) for impairment detection and/or for diagnostics in the operator's cloud. For example, method 300 may include using the MLM to determine the origin or characteristics of the impairment in response to determining, based on the determined impulse response and the determined group delay, that the impairment is located inside or outside of the home network of the field deployed device. As mentioned above, using an MLM may include collecting data objects, generating feature vectors based on the collected data objects, and applying the feature vectors to the MLMs to generate an analysis result. Using the MLM may also using any or all of the various machine learning techniques or technologies known in the art.

In some embodiments, method 300 may include using a machine learning model (MLM) to determine distance between the impairment and the location of field deployed device based on the determined impulse response and the determined group delay in response to determining that the impairment is not located outside of the home network of the field deployed device. Using the MLM to determine the distance between the impairment and the location of field deployed device may include determining whether the impairment is due to corroded radio frequency (RF) splitters, determining whether the impairment is due to corroded coaxial connectors; and/or determining whether the impairment is due to damaged coaxial cables.

In some embodiments, method 300 may include using a machine learning model (MLM) to determine the origin or characteristics of the impairment in response to determining based on the collected data, determined impulse response, and determined group delay that the impairment is located inside or outside of the home network of the field deployed device.

Figure 3B:
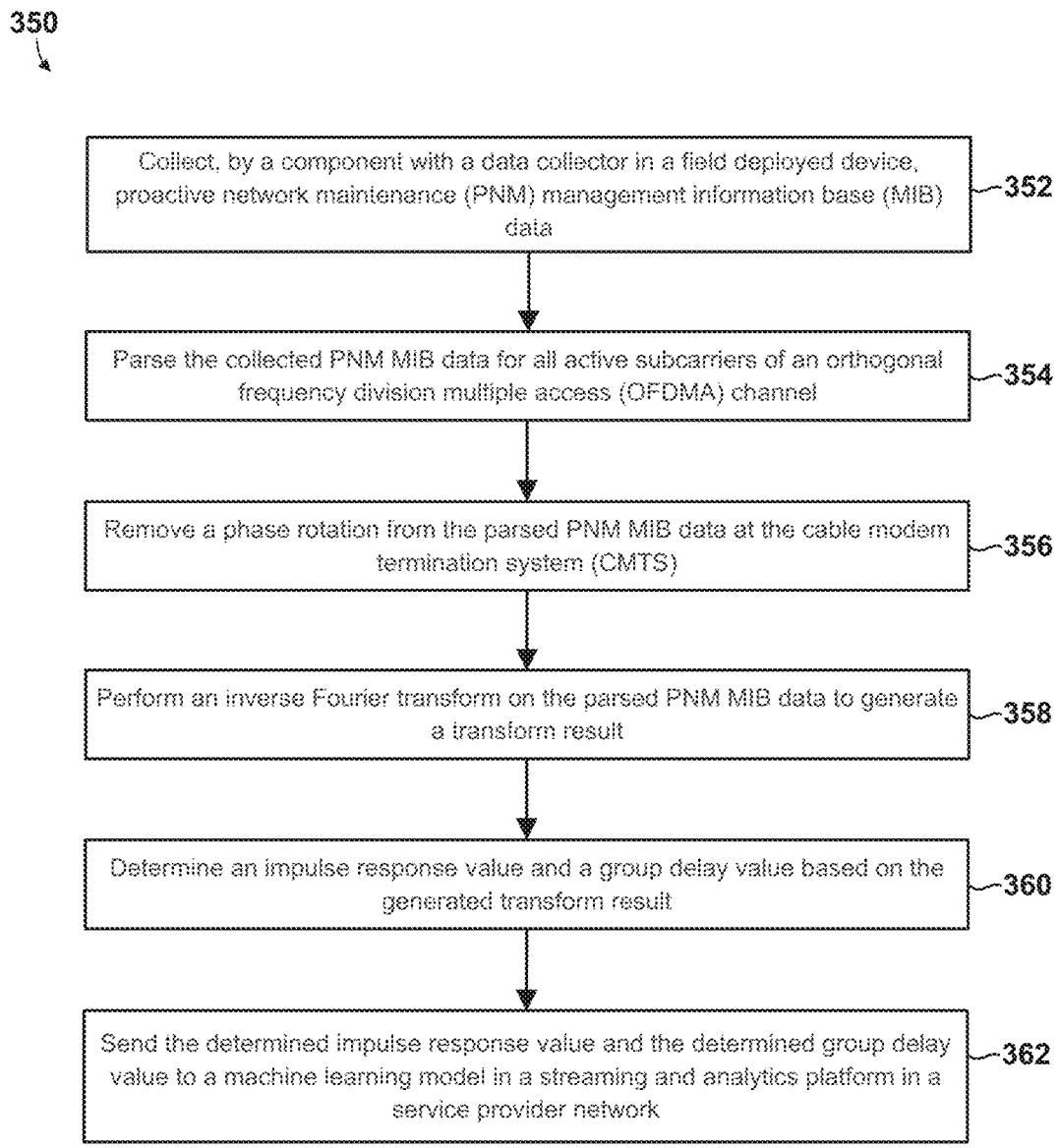

FIG. 3B illustrates a method 350 of detecting and analyzing cable plant impairments in accordance with some embodiments. Method 350 may be implemented in a processor of a field deployed device 202 that includes a smart agent implemented in the OpenWrt software stack (RG SoC).

In block 352, the processor may collect, via a component with a data collector in a field deployed device, proactive network maintenance (PNM) management information base (MIB) data. In some embodiments, collecting the PNM MIB data in block 352 may include collecting pre-equalizer coefficient values for all the active subcarriers in each of a plurality of OFDMA channels. In block 354, the processor may parse the collected PNM MIB data for all active subcarriers of an OFDMA channel (or plurality of OFDMA channels). In block 356, the processor may remove a phase rotation from the parsed PNM MIB data at the CMTS. In block 358, the processor may perform an inverse Fourier transform on the parsed PNM MIB data to generate a transform result. In block 360, the processor may determine an impulse response value and a group delay value based on the generated transform result. In some embodiments, determining the impulse response and the group delay values in block 360 may include determining impulse response values and group delay values for each of the plurality of OFDMA channels.

In block 362, the processor may send the determined impulse response values and/or the determined group delay values to a machine learning model (e.g., MLM 258, etc.) in a streaming and analytics platform (e.g., platform 290) in the service provider network. In response, a processor in the streaming and analytics platform may receive and use the impulse response values and/or group delay values to determine whether an impairment is located inside the home network of the field deployed device. In some embodiments, in response to determining that the impairment is located inside the home network of the field deployed device, the streaming and analytics processor may use a machine learning model determine an origin or a characteristic of the impairment.

In some embodiments, in response to determining that the impairment is not located inside the home network of the field deployed device and/or based on the determined origin or a characteristic of the impairment, the streaming and analytics processor may use one or more machine learning models to determine a distance between the impairment and a location of field deployed device, determine whether the impairment is due to corroded radio frequency (RF) splitters, determine whether the impairment is due to corroded coaxial connectors, determine whether the impairment is due to damaged coaxial cables, determine whether the impairment is due to damaged RF amplifiers, and/or determine whether the impairment is due to damaged coaxial taps.

Figure 4A:
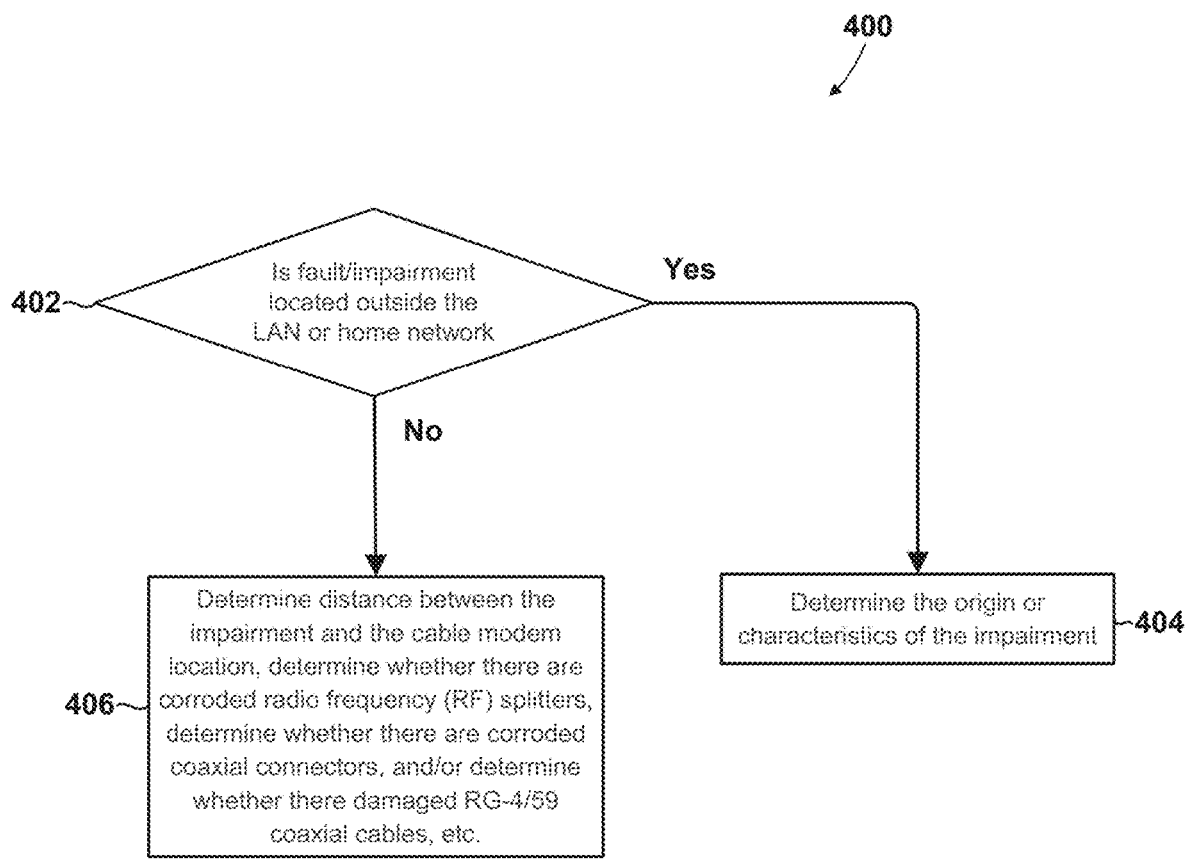
FIGS. 4A and 4B are process flow diagrams illustrating methods of determining the type and location of a cable plant impairment in accordance with some embodiments.
Figure 4B:
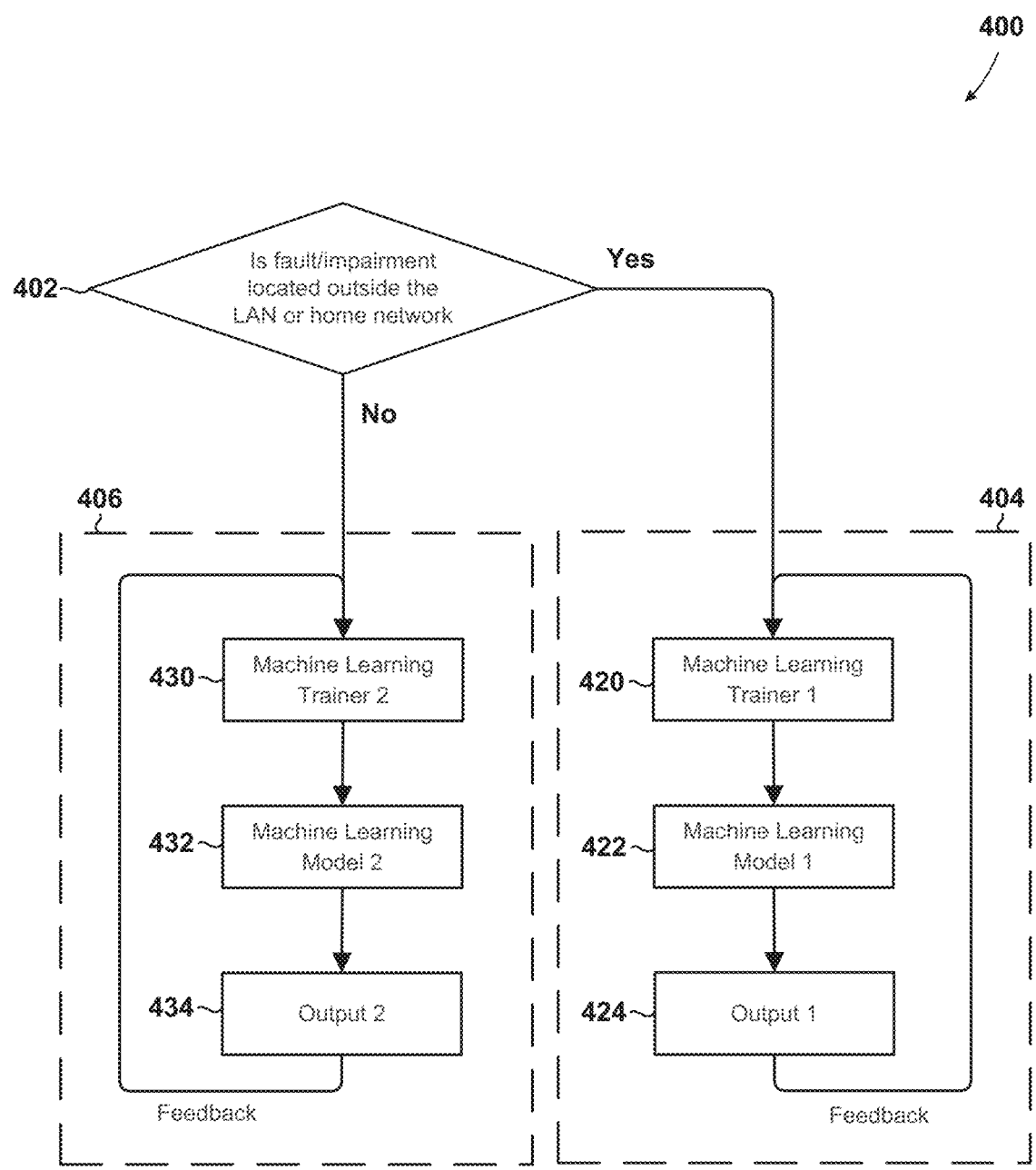

FIGS. 4A and 4B illustrate a method 400 of determining the type and location of a cable plant impairment in accordance with some embodiments. Method 400 may be implemented in a processor of a computing system.

In determination block 402, the processor may determine whether a cable plant fault is located either inside or outside the customer's home network.

Figure 7:
FIGS. 7 and 8 are diagrams that illustrate examples of an orthogonal frequency division multiple access (OFDMA) channel's impulse response and group delay.

FIG. 7 shows, as an example, that the processor may map the OFDMA channel impulse response vs. the OFDMA channel subcarrier number. The processor may determine that the OFDMA channel has 404 active subcarriers, which are spaced at 49.5 ns (time unit). The processor may determine that echo magnitude is −40 dB from the main signal, which is approximately at 0 dB. The processor may determine that the echo round-trip delay is about 1.633 μsec, which correspond to approximately 163 meters from the cable modem location. The processor may determine that this is the location of the CMTS. If these results were obtained from field-deployed D3.1 eMTA, it may indicate micro-reflection impairments outside the customer home. Further, there may be different type of coaxial RF amplifiers such as line RF amplifiers, bridge amplifiers and trunk amplifiers between the fiber node and the cable modem located at the customer home. Such micro-reflections may originate the diplex filter in the RF amplifiers, which is responsible for separating the downstream and upstream traffic.

The processor may also use the OFDMA channel impulse response (computed in block 310) to determine whether a selected cyclic prefix (CP) is sufficiently long to accommodate the longest and strongest echoes that are being corrected. The longer the coaxial cable is, the greater the RF attenuation the propagating signal will experience. For example, if the typical CP length for the OFDMA channel 2.50 μs, any RF echo longer than 2.50 μs must be sufficiently low to cause no harm to the main signal.

Figure 8:
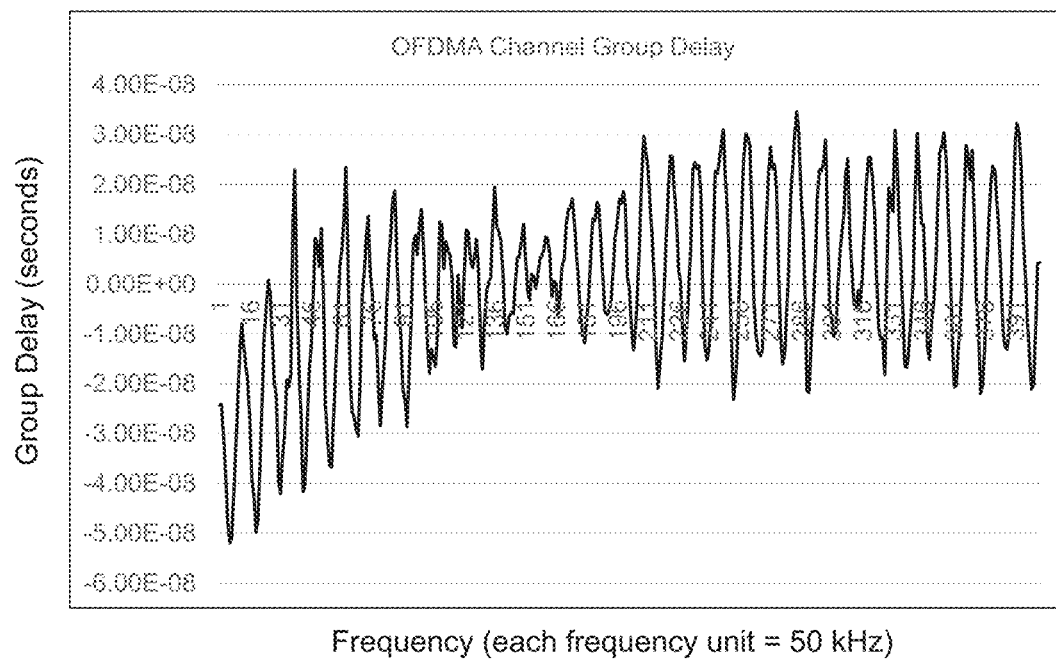
Figure 9:
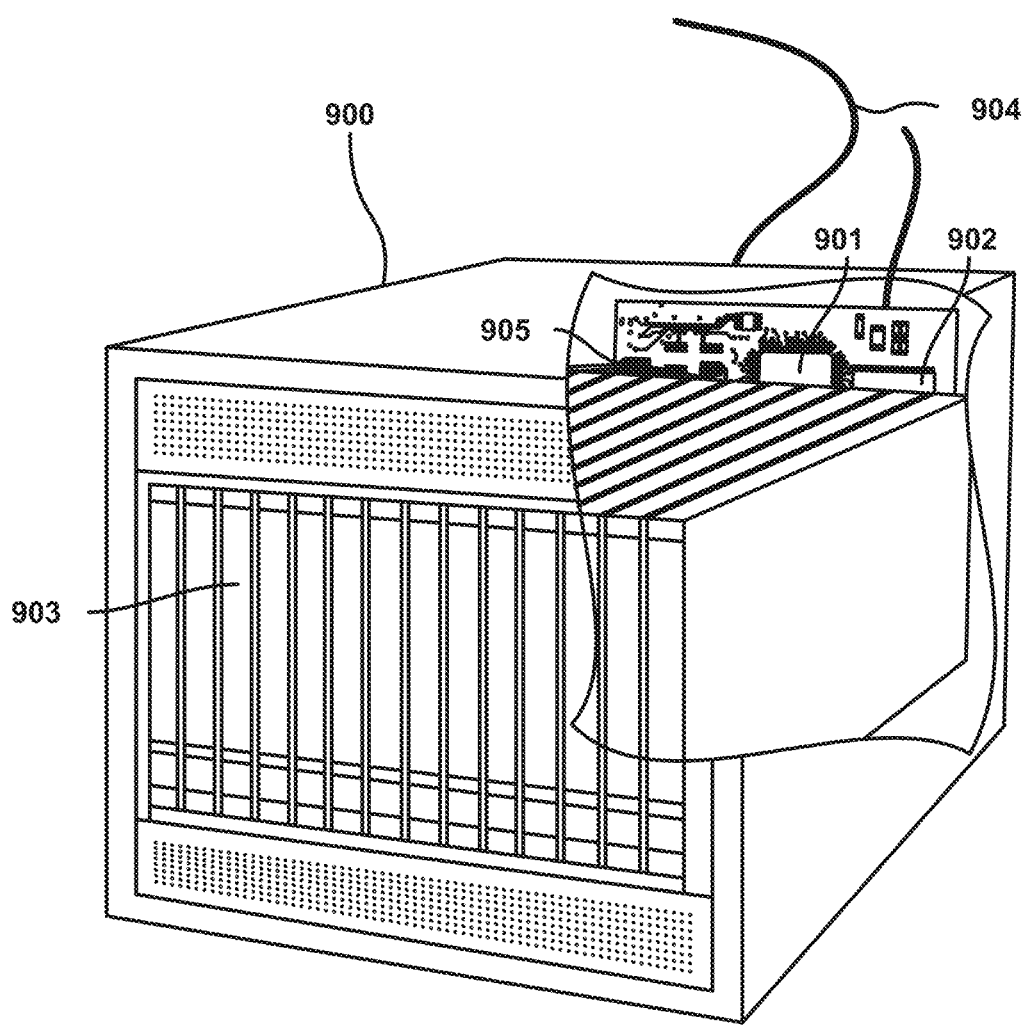
FIG. 9 is a component diagram of an example computing server device suitable for implementing the various embodiments.

The processor may also use the group delay value (computed in block 312). Group delay is the negative derivative of the propagating signal's phase with respect to frequency, expressed mathematically as $-(d\varphi/d\omega)$ in units of time such as nanoseconds. FIG. 8 shows an example of the Group Delay across the same OFDMA channel used in FIG. 7. A group delay variation may be the difference in propagation time between one frequency and another frequency of the propagating signal. That is, some frequency components of the signal may arrive at the output before others, causing distortion of the received signal. As such, a group delay variation (in seconds) across the OFDM subcarrier number (time or frequency) may indicate how well the pre-equalizer values are compensating for linear distortions such as micro-reflections, amplitude, Ripple, and GD in the OFDMA channel. The CM equalization can also be impacted by interference from band-limited LTE signals.

With reference to FIG. 4A, in response to determining that the cable plant fault is located inside or outside the customer's home network (i.e., determination block 402="Yes"), the processor may determine the origin or characteristics of the impairment (e.g., echo or micro-reflection, etc.) in block 404. FIG. 4B illustrates that, in some embodiments, in block 404 the processor may determine the origin or characteristics of the impairment by using a machine learning trainer in block 420 and a machine learning model (MLM) in block 422 to generate an output in block 424, which may be provided feedback to back to the machine learning trainer in block 420. The MLM may include decision nodes that test various conditions to generate answers various questions, such as are the observed cable plant impairments new (comparison to historical data)? Are the observed impairment persistent (i.e., over a period of 3-5 days)? Were the observed cable plant impairments previously seen (as reported by other cable modems served by the same or different CMTS)? Are the observed impairments weather related? What is the type/model of the impaired or damaged RF active component (comparison to historical data)? The processor may also determine whether there is a radio frequency in-line amplifiers, whether there are damaged or degraded RF coaxial cables, RF taps, RF splitters, and/or coaxial connectors, determine the location of the cable plant fault, and/or determine whether there are any indication of water in the cable plant cables in block 404.

With reference to FIG. 4A, in response to determining that the cable plant fault is not located outside the customer's home network (i.e., determination block 402="No"), in block 406 the processor may determine distance between the impairment and the location of field deployed device, determine whether there are corroded radio frequency (RF) splitters, determine whether there are corroded coaxial connectors, and/or determine whether there are damaged RG-6/59 coaxial cables. FIG. 4B illustrates that the processor may accomplish this in block 406 by using a machine learning trainer in block 430 and a machine learning model (MLM) in block 432 to generate an output in block 434, which may be provided as feedback to machine learning trainer in block 430 until the processor determines with sufficient precision or accuracy the distance between the impairment and the location of field deployed device.

Figure 5:
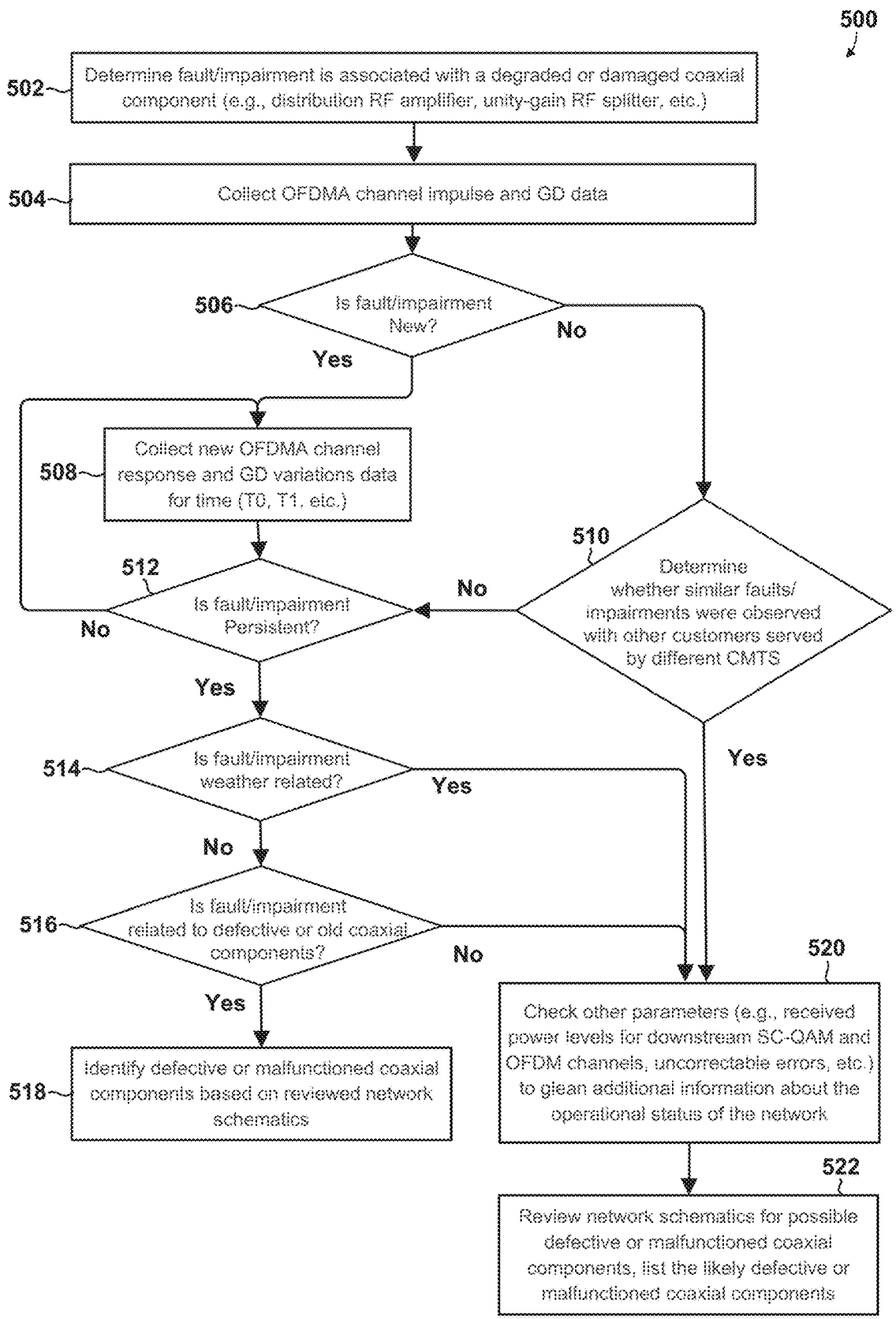
FIGS. 5 and 6 are process flow diagrams illustrating methods of proactively mitigate the impacts of the cable plant faults and/or in-home wiring issues on the field-deployed cable modem in accordance with some embodiments.

FIG. 5 illustrates a method 500 of proactively mitigate the impacts of the cable plant faults and/or in-home wiring issues on the field-deployed cable modem in accordance with some embodiments. Method 500 may be implemented in a processor of a computing system. Method 500 may be performed in response to determining that the cable plant fault is not located outside the customer's home network (i.e., determination block 402 in FIG. 4A="No").

In block 502, the processor may determine that the fault/impairment is associated with a degraded or damaged coaxial component (e.g., distribution RF amplifier, unity-gain RF splitter, etc.). In response to determining that the fault is associated with a degraded or damaged coaxial component, in block 504 the processor may collect OFDMA channel impulse and GD data.

In determination block 506, the processor may determine (e.g., based on a comparison of historical data, etc.) whether the fault/impairment is new.

In response to determining that the fault/impairment is new (i.e., determination block 506="Yes"), the processor may collect new OFDMA channel response and GD variations data for time (T0, T1, etc.) in block 508. For example, on the first pass, the processor may collect new OFDMA channel response and GD variations data for time T0 (3-5 days). On a next pass, the processor may collect new OFDMA channel response and GD variations data for time T1.

In response to determining that the fault/impairment is not new (i.e., determination block 506="No"), the processor may determine whether similar faults/impairments were observed with other customers served by different CMTS in determination block 510. In response to determining that similar faults/impairments were not observed with other customers served by different CMTS (i.e., determination block 510="No"), the processor may determine whether the fault/impairment is persistent in determination block 512.

In response to determining that the fault/impairment is not persistent (i.e., determination block 512="No"), the processor may collect new OFDMA channel response and GD variations data for time T1 in block 508.

In response to determining that the fault/impairment is persistent (i.e., determination block 512="Yes"), the processor may determine whether the fault/impairment is weather related in determination block 514.

In response to determining that the fault/impairment is not weather related (i.e., determination block 514="No"), the processor may determine whether the fault/impairment is related to defective or old coaxial components in determination block 516.

In response to determining that the fault/impairment is related to defective or old coaxial components (i.e., determination block 516="Yes"), the processor may identify defective or malfunctioned coaxial components based on reviewed network schematics in block 518.

In response to determining that similar faults/impairments were observed with other customers served by different CMTS (i.e., determination block 510="Yes"), in response to determining that the fault/impairment is weather related (i.e., determination block 514="Yes") and/or in response to determining that the fault/impairment is not related to defective or old coaxial components (i.e., determination block 516="No"), the processor may check other parameters (e.g., received power levels for downstream SC-QAM and OFDM channels, uncorrectable errors, etc.) to glean additional information about the operational status of the network in block 520.

In block 522, the processor may review network schematics for possible defective or malfunctioned coaxial components, list the likely defective or malfunctioned coaxial components.

The network operator may then send a field technician to repair or replace the suspected component.

Figure 6:
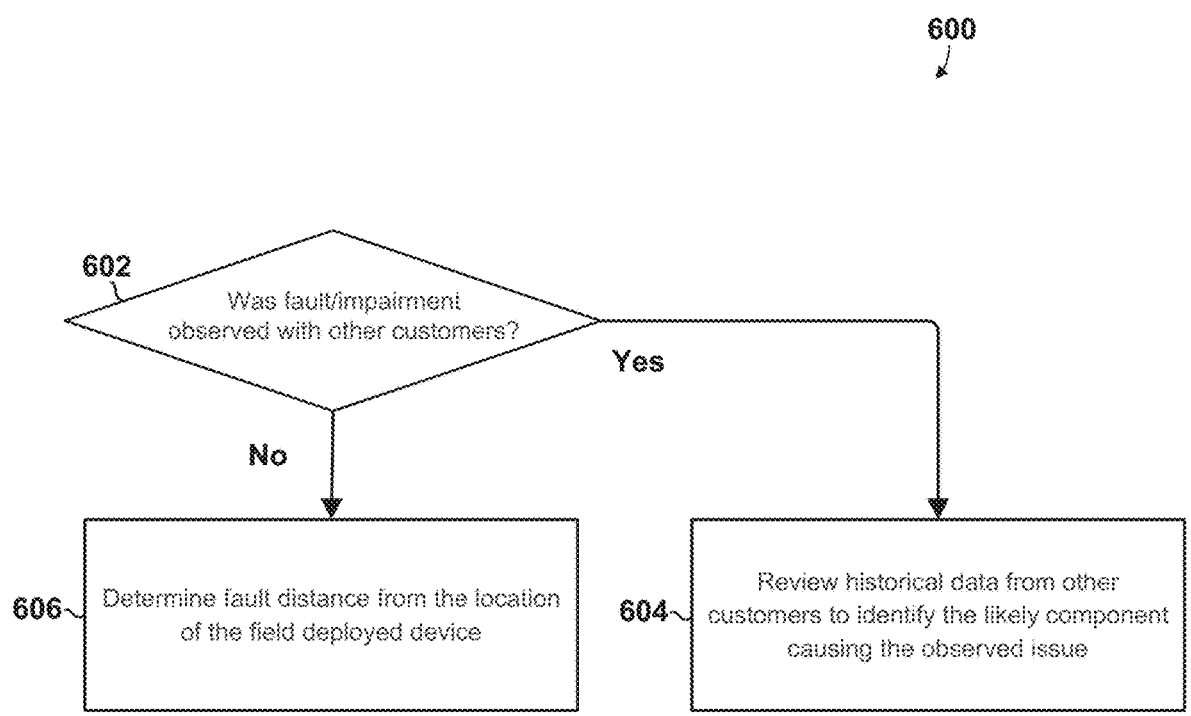

FIG. 6 illustrates a method 600 of proactively mitigate the impacts of the cable plant faults and/or in-home wiring issues on the field-deployed cable modem in accordance with some embodiments. Method 600 may be implemented in a processor of a computing system. Method 600 may be performed in response to determining that the cable plant fault is located outside the customer's LAN or home network (i.e., determination block 402 in FIG. 4A="Yes").

In determination block 602, the processor may determine whether the fault/impairment was observed with other customers.

In response to determining that the fault/impairment was observed with other customers (i.e., determination block 602="Yes"), the processor may review historical data from other customers to identify the likely component causing the observed issue in block 604.

In response to determining that the fault/impairment was not observed with other customers (i.e., determination block 602="No"), the processor may determine the fault distance from the location of the field deployed device in block 606. Based on the fault distance from the cable modem location, customer care agent may work with the customer to find out which component in the in-home wiring is causing the fault.

FIG. 7 illustrates an example of an OFDMA channel's impulse response. As discussed above, in some embodiments, the processor may map the OFDMA channel impulse response vs. the OFDMA channel subcarrier number, determine that the OFDMA channel has 404 active subcarriers (49.5 ns (time unit)), determine that echo magnitude is −40 dB from the main signal (approximately at 0 dB), and determine that the echo round-trip delay is about 1.633 μsec (corresponding to approximately 163 meters from the cable modem location). In response, the processor may determine that the CMTS is approximately 163 meters from the cable modem location. In embodiments in which such results are obtained from field-deployed D3.1 eMTA, it may indicate micro-reflection impairments outside the customer's home. Further, there may be different type of coaxial RF amplifiers such as line RF amplifiers, bridge amplifiers and trunk amplifiers between the fiber node and the cable modem located at the customer home. Such micro-reflections may originate the diplex filter in the RF amplifiers, which is responsible for separating the downstream and upstream traffic.

The processor may also use the OFDMA channel impulse response to determine whether a selected cyclic prefix (CP) is sufficiently long to accommodate the longest and strongest echoes that are being corrected. The longer the coaxial cable is, the greater the RF attenuation the propagating signal will experience. For example, if the typical CP length for the OFDMA channel 2.50 μs, any RF echo longer than 2.50 μs must be sufficiently low to cause no harm to the main signal.

FIG. 8 illustrates an example of the OFDMA channel's group delay (the same OFDMA channel illustrated in FIG. 7). As discussed above, a group delay variation may be the difference in propagation time between one frequency and another frequency of the propagating signal. That is, some frequency components of the signal may arrive at the output before others, causing distortion of the received signal. As such, a group delay variation (in seconds) across the OFDMA subcarrier number (time or frequency) may indicate how well the pre-equalizer values are compensating for linear distortions such as micro-reflections, amplitude, Ripple, and group delay in the OFDMA channel. The cable modem equalization may also be impacted by interference from band-limited LTE signals.

As mentioned above, upstream pre-equalization may allow field deployed devices to adapt their transmission to maximize the fidelity at the receiver. To achieve this, the CMTS measures the received signal and calculates the amplitude and phase corrections that are needed. This correction information may be represented as a set of complex coefficients that are transmitted to the field deployed device in the downstream channel. When the field deployed device receives the coefficients, it applies them to the transmitter to pre-distort the signal by using a waveform that is the inverse of the channel response. This process runs periodically as directed by the operator. The adaptive pre-equalizer may serve an important role in PNM and may be valuable in OFDMA. The discussing below highlights differences between DOCSIS 3.1 pre-equalization and its predecessors.

The CMTS may instruct the field deployed device to send a signal either with or without equalization (if it was given equalization levels to use before). In the former case, the CMTS tells the field deployed device the changes (deltas) to implement from the previous equalization used. In the latter case, the CMTS tells the field deployed device what equalization settings to use.

One of most obvious differences between DOCSIS 3.1 and DOCSIS 3.0 adaptive pre-equalization is the wider bandwidth of DOCSIS 3.1 systems. Channel width for DOCSIS 3.0 systems was fixed at either 1.6, 3.2 MHz or 6.4 MHz and used 24 T-spaced time domain equalizer taps, whereas DOCSIS 3.1 OFDMA has a channel width of up to 96 MHz and uses per subcarrier frequency domain coefficients. There is greater time resolution when wider channels are implemented, which provides more precise distance calculations than narrower channels. The time resolution may be calculated as the reciprocal of the total equalizer bandwidth. For example, a 96 MHz-wide OFDMA channel has 1,920 coefficients at 50-kHz spacing. In the time domain, each point represents 1/96 MHz, or 10.416 ns. This scenario may be compared to previous versions of 24-tap equalization coefficients of a 6.4 MHz-wide SC-QAM in which the signal's symbol rate is 5.12 Msym/s, which gives a time resolution of 195 ns. Because DOCSIS 2.0 and 3.0 technology specifies 24-tap T-spaced pre-equalization in the upstream, the maximum span of an adaptive equalizer for a 5.12-Msym/s signal is calculated by one of these methods.

$$(24-1) \times 0.1953125 \ \mu s = 4.49 \ \mu s$$

$$(24-1)/5.12 \ \text{MHz} = 4.49 \ \mu s$$

This value compares to the maximum span of the 96 MHz-wide OFDMA channel with 50-kHz spacing, shown below.

$$1,920 \times 0.0104166 \ \mu s = 20 \ \mu s$$

Another significant difference between DOCSIS 3.0 and DOCSIS 3.1 PNM capabilities is the addition of summary metrics. Anticipating the additional complexity of extracting, decoding, and calculating a string of 1,920 coefficient values, the specification (e.g., [DOCSIS Physical Layer Specification v3.1], etc.) provides summary values that are already computed. In DOCSIS 3.1 systems, OFDMA pre-equalization occurs in the frequency domain, whereas it is in the time domain for DOCSIS 3.0 systems.

The pre-equalizer coefficients at the CM may be the values in use by the field deployed device for upstream pre-equalization (PNMUsPreEq). The CMTS coefficients are the last set of pre-equalization updates that were sent to the field deployed device by the CMTS (PNMUsPreEqLastUpdate). Any or all of the sets of coefficients may be stored in the field deployed device. In ideal plant conditions, the adjustments are minor. In typical plant conditions, some adjustments are needed, but the adjustments that the field deployed device makes, reflected in the Pre-Eq coefficients, may fully reflect the condition of the plant (noise, in practice, will always prevent "perfection") as long as the channel impulse response is negligible beyond the duration of the cyclic prefix. Thus, the pre-equalization in typical plant conditions provides that the signal presented to the burst receiver is "nearly optimal" when the cyclic prefix is maintained the same as used with the Probe. However, there may be some less-common cases where the field deployed device cannot fully adjust and accept the coefficients given to it by the CMTS.

The pre-equalization coefficients may be developed in the CMTS in response to a Probe transmitted by the field deployed device. A Probe may contain all subcarriers of an OFDMA channel which are not excluded. The CMTS may instruct the field deployed device to transmit a Probe without using pre-equalization coefficients, which is analogous to a "reset" operation and in which case the RNG-RSP sent to the field deployed device contains Pre-EQ coefficients defined to be used in a Set operation meaning that the coefficients are applied directly. In ongoing, stable operation, it is expected that the CMTS will instruct the field deployed device to transmit the Probe using its current pre-equalization coefficients and any changes if needed will be sent in an RNG-RSP with coefficients defined to be used as an Adjust.

The pre-equalization coefficients may be sent to the CMTS. The PNM server may be part of the operator's analytics platform and configured to identify patterns from many CMs or field deployed devices connected to the same CMTS. The CMTS may provide adaptive pre-equalization customized to each CM or field deployed device.

The pre-equalization coefficients sent by the field deployed device to the PNM server may be complex numbers using s2.13 format and expressed as 32 bits with the most significant 16 bits for the I component while the least significant 16 bits are for the Q value. However, the CMTS may use s1.14 format to send the updates to the field deployed device. To update the pre-equalization coefficients, the field deployed device may perform a complex-multiply of the existing field deployed device pre-equalization coefficients by their corresponding updates, to yield the new pre-equalization coefficients. As such, an update pre-equalization coefficient which is "1+j0" (where "j" is square-root of negative 1), may result in "no change" to the corresponding existing pre-equalization coefficient in the field deployed device.

Normally the updates from the CMTS would be minimal (e.g., near unity magnitude) indicating a stable plant. Large adjustments (magnitude of an update value which is much larger or much smaller than unity) would indicate instability in which the CMTS (working with the field deployed device) was unable to achieve acceptable equalization. Pre-equalization may be conducted periodically, and not much variation should appear under normal operational conditions. Thus, this measurement is a valuable tool in support of PNM goals.

The pre-equalizer at the field deployed device should provide an optimal response to the upstream burst receiver, for that field deployed device's transmissions. In this embodiment, the receiver will not need any adaptive equalization. The pre-equalization may deviate from "nearly optimal" for the channel, because of a) noise in and received by the receiver when creating the pre-equalization, b) the channel's impulse response is non-negligible beyond the duration of the cyclic prefix, or c) a change in the channel impulse response since the most recent pre-equalization. In the event of a) or c), there may be some residual equalization needed at the burst receiver of the CMTS for best reception. Using conventional solutions, it is challenging to get information about any additional equalization done by the burst receiver. A sufficient approach for estimating the channel in almost all cases is to invert the field deployed device transmitter pre-equalization which resulted from the most recent update from the CMTS.

Because the pre-equalization typically should be able to take care of the entire needed plant response, and thus the burst receiver should have no additional work to do to equalize the received response, any indication that the burst receiver had additional work to do, i.e., updates which deviate significantly from unity magnitude, may be an indication of needed maintenance work.

In embodiments in which the field deployed device receives the pre-equalization coefficient updates from the CMTS, typically the field deployed device responds (via PreEqCoAdjStatus) with a "success" once it fully applies the requested adjustments to its pre-eq coefficients. In embodiments in which the CMTS coefficients cannot be adopted fully by the field deployed device, the response may not be a "success." For example, if there is too much tilt or ripple in the channel forcing the field deployed device to clip the coefficients before applying them, then the status response is "clipped." Other reasons that the field deployed device needs to modify the coefficients may result in a status of "other." If the field deployed device is unable apply the adjustments at all, it may send a status of "rejected." Any of these last three status results may indicate that the field deployed device response is not able to fully adjust to the plant conditions to provide an optimal signal to the CMTS. In this case, if there is an adaptive equalizer in the CMTS burst receiver, there may be residual work for the CMTS burst receiver to do. Further, simply knowing that the field deployed device is not able to apply the adjustments fully or at all is sufficient for determining that maintenance should be conducted, which is our main purpose.

It should be noted that, in the event that the field deployed device pre-equalization is not implementing the updates it was provided by the CMTS, or the plant has changed, if the burst receiver employs an adaptive equalizer, the plant channel response could be theoretically characterized by using both a) the field deployed device's pre-equalization coefficients (which are obtainable via PNM) and b) the CMTS receiver adaptive pre-equalization if implemented (which is not obtainable via PNM). In this case, the inverse of the composite of a) the transmit pre-equalization, and b) the receive adaptive equalization, could theoretically provide a more accurate estimate of the channel impulse response.

Pre-equalization values are of use in a few ways. Large deviations from 0 dB in the pre-equalization values may indicate the plant needs large adjustments in equalization so the field deployed device energy may be stressed to compensate for these plant conditions. In addition, large differences between the current and last pre-equalization values can indicate that the plant conditions are rapidly changing. If several field deployed devices show this condition, or the condition appears repeatedly over time, or both, then this large difference can indicate unstable plant that needs attention through maintenance. Without attention, there may be changes in the plant that get worse and cause poor performance due to the equalizers not being able to compensate. Further, if a field deployed device is not able to accept and implement the pre-equalizer settings it was given, this is an indication that there is a problem isolated to a single field deployed device. If field deployed devices in a group are often not able to implement the pre-equalization fully, it can indicate that plant conditions are poor and need attention.

Pre-equalization may be considered for use in these ways to determine the urgency of maintenance, proactive or otherwise.

Some embodiments may include a Pre-EQ Plugin, which may be configured to collect the upstream pre-equalization coefficients received from the CMTS, and calculate the impulse response and group delay for each OFDMA channel (this is the cable fault detection system).

Some embodiments may include a collected or smart agent software component on the cable modem software with many different types of plugins that stream all the collected telemetry data to the operator's streaming and analytics platform via the MQTT server.

In some embodiments the field deployed device may include a cable modem software stack that includes the OpenWrt, Linux kernel, Silicon vendor SDK, collected, and OpenSync™ layer, and which is configured to enable any or all of the cable modem operation, connectivity to the OpenSync™ cloud, and/or streaming telemetry functionality.

Some embodiments may include an OpenSync™ Cloud component that includes a Network Operations Center (NOC) and OpenSync™ controller for managing a network of OpenSync™-enabled devices. The OpenSync™ cloud may provide operator-friendly services, including: device and firmware management, inventory and billing system, network performance control, onboarding and provisioning of field-deployed devices, telemetry reporting and data analytics, network operations, and customer support.

Some embodiments may include an MQTT server. MQTT is a lightweight Machine to-Machine (M2M) transport communications protocol. The D3.1 eMTA may stream the telemetry data statistics to the Operator's eMTA dashboard via the MQTT server that is hosted in the OpenSync™ cloud.

Some embodiments may include a streaming and analytics platform, which may be configured to ingest the streamed telemetry data via the Kafka Connector source for the MQTT server, analyze the ingest data via the machine learning models (MLMs) depending on the type of data, and display the data on the operator's eMTA dashboard. In some embodiments, the MLM may be a software program that has been trained to parse the received telemetry data, recognize certain data patterns, and provide predictions.

Some embodiments may include an impairment diagnostic system (e.g., impairment diagnostic system 207 illustrated in FIG. 2A, etc.) that includes a supervised decision-tree learning algorithm in the operator's streaming and analytics platform that is configured to determine whether the cable plant fault is located inside or outside the customer's home network.

Some embodiments may include a proactive action system (e.g., proactive action system 209 illustrated in FIG. 2A, etc.), which may be included the operator's streaming and analytics platform and configured to use MLM and/or to provide specific action plan to mitigate the impacts of the identified cable plant faults and/or in-home wiring issues on the field-deployed cable modem (e.g., based on the results obtained from the impairment diagnostic system 207 illustrated in FIG. 2A, etc.).

Some embodiments may include an eMTA dashboard. In some embodiments, the eMTA dashboard may be an agile color-coded hierarchical dashboard in the operator's streaming and analytics platform that is configured to display the streamed and analyzed telemetry data from each field-deployed cable modem.

Some embodiments may include a system detecting and analyzing cable plant impairments that includes a field deployed device and a streaming and analytics platform device.

In some embodiments, the field deployed device may include a processor that is configured to collect proactive network maintenance (PNM) management information base (MIB) data, parse the collected PNM MIB data for all active subcarriers of an orthogonal frequency division multiple access (OFDMA) channel (or of a plurality of OFDMA channels), remove a phase rotation from the parsed PNM MIB data at a cable modem termination system (CMTS), perform an inverse Fourier transform on the parsed PNM MIB data to generate a transform result, determine impulse response values and/or group delay values based on the generated transform result (e.g., for each of the plurality of OFDMA channels, etc.), and send the impulse response and/or group delay values to a machine learning model in a streaming and analytics platform in a service provider network.

In some embodiments, the streaming and analytics platform device may include a processor that is configured to receive collected and parsed proactive network maintenance (PNM) management information base (MIB) data from the field deployed device, and receive impulse response values and group delay values for all active subcarriers in each of a plurality of OFDMA channels from the field deployed device.

In some embodiments, the streaming and analytics processor may be configured to train a machine learning model to identify certain impairments in the network based on historical data received from a plurality of field deployed devices that share one or more characteristics with the field deployed device.

In some embodiments, the streaming and analytics processor may be configured to use a machine learning model to determine whether an impairment is located inside a home network of the field deployed device based on the received impulse response values and the received group delay values.

In some embodiments, the streaming and analytics processor may be configured to use the machine learning model to determine an origin or a characteristic of the impairment in response to determining that the impairment is located inside the home network of the field deployed device.

In some embodiments, the streaming and analytics processor may be configured to use the machine learning model to determine a distance between the impairment and a location of field deployed device in response to determining that the impairment is not located inside of the home network of the field deployed device. In some embodiments, the streaming and analytics processor may be configured to determine whether the impairment is due to corroded radio frequency (RF) splitters, determine whether the impairment is due to corroded coaxial connectors, determine whether the impairment is due to damaged coaxial cables, determine whether the impairment is due to damaged RF amplifiers, and/or determine whether the impairment is due to damaged coaxial taps.

Various embodiments may be implemented on any of a variety of commercially available computing devices, such as the computing device 1000 illustrated in FIG. 10. Such a computing device 1000 may include a processor 1001 coupled to volatile memory 1002 and a large capacity nonvolatile memory, such as a disk drive 1003. The computing device 1000 may also include network access ports 1005 coupled to the processor 1001 for establishing data connections with a network connection circuit 1004 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for detecting and analyzing cable plant impairments, comprising:
    collecting, by a component with a data collector in a field deployed device, proactive network maintenance (PNM) management information base (MIB) data;
    parsing the collected PNM MIB data for all active subcarriers of an orthogonal frequency division multiple access (OFDMA) channel;
    removing a phase rotation from the parsed PNM MIB data at a cable modem termination system (CMTS);
    performing an inverse Fourier transform on the parsed PNM MIB data to generate a transform result;
    determining an impulse response value and a group delay value based on the generated transform result; and
    sending the determined impulse response value and the determined group delay value to a machine learning model in a streaming and analytics platform in a service provider network.

2. The method of claim 1, wherein:
    collecting the PNM MIB data comprises collecting pre-equalizer coefficient values for all the active subcarriers in each of a plurality of OFDMA channels, and
    determining the impulse response value and the group delay value based on the generated transform result comprises determining impulse response values and group delay values for each of the plurality of OFDMA channels; and
    the method further comprises determining whether an impairment is located inside a home network of field deployed device based on the impulse response values and the group delay values.

3. The method of claim 1, further comprising determining, based on the determined impulse response value and the determined group delay value, whether an impairment is located inside a home network of the field deployed device.

4. The method of claim 3, further comprising using the machine learning model to determine an origin or a characteristic of the impairment in response to determining, based on the determined impulse response value and the determined group delay value, that the impairment is located inside the home network of the field deployed device.

5. The method of claim 3, further comprising using the machine learning model to determine a distance between the impairment and a location of field deployed device based on the determined impulse response value and the determined group delay value in response to determining that the impairment is not located inside of the home network of the field deployed device.

6. The method of claim 5, wherein using the machine learning model to determine the distance between the impairment and the location of field deployed device based on the determined impulse response value and the determined group delay value in response to determining that the impairment is not located inside of the home network of the field deployed device further comprises:
   determining whether the impairment is due to corroded radio frequency (RF) splitters;
   determining whether the impairment is due to corroded coaxial connectors;
   determining whether the impairment is due to damaged coaxial cables;
   determining whether the impairment is due to damaged RF amplifiers; or
   determining whether the impairment is due to damaged coaxial taps.

7. A field deployed device, comprising:
a processor configured to:
   collect proactive network maintenance (PNM) management information base (MIB) data;
   parse the collected PNM MIB data for all active subcarriers of an orthogonal frequency division multiple access (OFDMA) channel;
   remove a phase rotation from the parsed PNM MIB data at a cable modem termination system (CMTS);
   perform an inverse Fourier transform on the parsed PNM MIB data to generate a transform result;
   determine an impulse response value and a group delay value based on the generated transform result; and
   send the determined impulse response value and the determined group delay value to a machine learning model in a streaming and analytics platform in a service provider network.

8. The field deployed device of claim 7, wherein:
the processor is configured to:
   parse the collected PNM MIB data for all the active subcarriers of the OFDMA channel by parsing the collected PNM MIB data for all the active subcarriers of a plurality of OFDMA channels; and
   determine the impulse response value and the group delay value based on the generated transform result by determining impulse response values and group delay values for each of the plurality of OFDMA channels based on the generated transform result.

9. A computing system, comprising:
a processor configured to:
   receive collected and parsed proactive network maintenance (PNM) management information base (MIB) data from a field deployed device;
   receive impulse response values and group delay values for all active subcarriers in each of a plurality of OFDMA channels from the field deployed device; and
   use a machine learning model to determine whether an impairment is located inside a home network of the field deployed device based on the received impulse response values and the received group delay values.

10. The computing system of claim 9, wherein the processor is further configured to train a machine learning model to identify certain impairments in the network based on historical data received from a plurality of field deployed devices that share one or more characteristics with the field deployed device in response to determining that the impairment is not located inside the home network of the field deployed device.

11. The computing system of claim 9, wherein the processor is further configured to use the machine learning model to determine an origin or a characteristic of the impairment in response to determining that the impairment is located inside the home network of the field deployed device.

12. The computing system of claim 9, wherein the processor is further configured to use the machine learning model to determine a distance between the impairment and a location of field deployed device in response to determining that the impairment is not located inside of the home network of the field deployed device.

13. The computing system of claim 9, wherein the processor is further configured to:
   determine whether the impairment is due to corroded radio frequency (RF) splitters;
   determine whether the impairment is due to corroded coaxial connectors;
   determine whether the impairment is due to damaged coaxial cables;
   determine whether the impairment is due to damaged RF amplifiers; or
   determine whether the impairment is due to damaged coaxial taps.

14. A system for detecting and analyzing cable plant impairments, comprising:
   a field deployed device comprising a field deployed device processor; and
   a computing system comprising a streaming and analytics processor,
   wherein the field deployed device processor is configured to:
      collect proactive network maintenance (PNM) management information base (MIB) data;
      parse the collected PNM MIB data for all active subcarriers of an orthogonal frequency division multiple access (OFDMA) channel;
      remove a phase rotation from the parsed PNM MIB data at a cable modem termination system (CMTS);
      perform an inverse Fourier transform on the parsed PNM MIB data to generate a transform result;
      determine an impulse response value and a group delay value based on the generated transform result; and
      send the determined impulse response value and the determined group delay value to a machine learning model of the streaming and analytics platform device.

15. The system of claim 14, wherein:
the field deployed device processor is configured to:
- parse the collected PNM MIB data for all the active subcarriers of the OFDMA channel by parsing the collected PNM MIB data for all the active subcarriers of a plurality of OFDMA channels; and
- determine the impulse response value and the group delay value based on the generated transform result by determining impulse response values and group delay values for each of the plurality of OFDMA channels; and the streaming and analytics processor is configured to determine whether an impairment is located inside a home network of field deployed device based on the impulse response values and the group delay values.

16. The system of claim 14, wherein the streaming and analytics processor is further configured to determine based on the determined impulse response value and the determined group delay value whether an impairment is located inside a home network of the field deployed device.

17. The system of claim 16, wherein the streaming and analytics processor is further configured to use the machine learning model to determine an origin or a characteristic of the impairment in response to determining, based on the determined impulse response value and the determined group delay value, that the impairment is located inside the home network of the field deployed device.

18. The system of claim 16, wherein the streaming and analytics processor is further configured to use the machine learning model to determine a distance between the impairment and a location of field deployed device based on the determined impulse response value and the determined group delay value in response to determining that the impairment is not located inside of the home network of the field deployed device.

19. The system of claim 18, wherein the streaming and analytics processor is further configured to:
- determine whether the impairment is due to corroded radio frequency (RF) splitters;
- determine whether the impairment is due to corroded coaxial connectors;
- determine whether the impairment is due to damaged coaxial cables;
- determine whether the impairment is due to damaged RF amplifiers; or
- determine whether the impairment is due to damaged coaxial taps.

* * * * *